(12) United States Patent
Miyamori et al.

(10) Patent No.: US 7,787,214 B2
(45) Date of Patent: Aug. 31, 2010

(54) DISK DEVICE

(75) Inventors: Kenichi Miyamori, Hyogo (JP); Shigeo Obata, Hyogo (JP); Hiromitsu Noda, Osaka (JP); Yoshiro Ueno, Osaka (JP)

(73) Assignee: Panasonic Corporation, Osaka (JP)

( * ) Notice: Subject to any disclaimer, the term of this patent is extended or adjusted under 35 U.S.C. 154(b) by 312 days.

(21) Appl. No.: 11/570,000

(22) PCT Filed: Jan. 12, 2006

(86) PCT No.: PCT/JP2006/300251

§ 371 (c)(1),
(2), (4) Date: Dec. 4, 2006

(87) PCT Pub. No.: WO2006/075639

PCT Pub. Date: Jul. 20, 2006

(65) Prior Publication Data

US 2009/0083772 A1    Mar. 26, 2009

(30) Foreign Application Priority Data

| Jan. 13, 2005 | (JP) | 2005-005913 |
| Mar. 9, 2005 | (JP) | 2005-065242 |
| May 17, 2005 | (JP) | 2005-143749 |

(51) Int. Cl.
*G11B 17/038* (2006.01)
(52) U.S. Cl. ................. 360/99.12; 360/98.08
(58) Field of Classification Search .............. 360/98.08, 360/99.12
See application file for complete search history.

(56) References Cited

U.S. PATENT DOCUMENTS

| 5,369,537 A | 11/1994 | Kinoshita et al. |
| 5,490,022 A * | 2/1996 | Hoshina et al. ......... 360/98.08 |
| 5,504,638 A * | 4/1996 | Kinoshita et al. ....... 360/98.08 |
| 5,760,999 A * | 6/1998 | Yahata .................... 360/98.01 |

(Continued)

FOREIGN PATENT DOCUMENTS

JP       01300483 A * 12/1989

(Continued)

OTHER PUBLICATIONS

International Search Report for PCT/JP2006/300251, dated Feb. 14, 2006.

*Primary Examiner*—William J Klimowicz
(74) *Attorney, Agent, or Firm*—RatnerPrestia

(57) ABSTRACT

A disk apparatus includes a hub having a disk inserting portion having a cylindrical plane in the outer part of one end and a disk receiving portion having a flat part and being pivotably supported, a head having an inner hole through which the disk inserting portion is fitted, facing toward one face of a disk, levitating and scanning above the disk and reading a signal recorded on the disk or recording a signal on the disk, the disk being held by the disk receiving portion, and a clamp unit holding the disk with the disk receiving portion. In this case, the disk receiving portion has an inclined or declined plane. Thus, the amount and direction of deformation of the disk, which is caused by clamping, are defined, and obtaining a stable amount of head levitation independently of temperature changes can prevent the occurrence of a distortion of the disk.

8 Claims, 14 Drawing Sheets

U.S. PATENT DOCUMENTS

| | | | |
|---|---|---|---|
| 6,212,030 B1 * | 4/2001 | Koriyama et al. | 360/98.08 |
| 6,215,617 B1 * | 4/2001 | Okumura et al. | 360/99.12 |
| 6,381,092 B1 * | 4/2002 | Suzuki | 360/98.08 |
| 2002/0034041 A1 * | 3/2002 | Luo et al. | 360/99.12 |
| 2006/0044676 A1 * | 3/2006 | Ueda et al. | 360/98.08 |

FOREIGN PATENT DOCUMENTS

| | | | |
|---|---|---|---|
| JP | 4-121043 U | | 10/1992 |
| JP | 5-59640 U | | 8/1993 |
| JP | 6-119697 A | | 4/1994 |
| JP | 6-139675 A | | 5/1994 |
| JP | 6-168536 A | | 6/1994 |
| JP | 7-98912 A | | 4/1995 |
| JP | 8-315533 A | | 11/1996 |
| JP | 10172258 A | * | 6/1998 |
| JP | 11296943 A | * | 10/1999 |
| JP | 2000057727 A | * | 2/2000 |
| JP | 2002-133743 A | | 5/2002 |
| JP | 2002298479 A | * | 10/2002 |

* cited by examiner

Output waveform

Time

DISK DEVICE

This application is a U.S. National Phase application of PCT International Application PCT/JP2006/300251.

TECHNICAL FIELD

The present invention relates to a disk apparatus to be used for reading/writing information. More specifically, it relates to a thin clamp structure for fixing a disk to a hub in a disk apparatus having a head for writing/reading at least on one side of a disk-shaped recording medium (also simply called disk, hereinafter) that the disk apparatus includes.

BACKGROUND ART

In recent years, a large capacity of information can be recorded on a disk having a small recording area with an increase in density of a disk apparatus. Thus, various kinds of technology to be used in a disk apparatus have been developed as recording media for mobile equipment, for example. A recording medium for mobile equipment may be required to be, apparently, small in size and weight, and have low power consumption and shock resistance in consideration of the usages.

FIG. 16 is a section view showing a first example of the clamp structure in a conventional disk apparatus. In FIG. 16, clamp member 3 has disk 1 between disk pressing portion 3g and disk receiving surface 2e of hub 2 through the axial force of screw thread 4. Disk 1 is integrally fixed to hub 2 by the frictional force of the contacts of the members. When a large shock is applied thereto beyond the frictional force, a phenomenon called disk shift occurs in which the position of disk 1 fixed to clamp member 3 and hub 2 is shifted largely. The disk shift is one of factors for causing a rotational runout of disk 1. Upon occurrence of the disk shift, the data track originally coaxial with the rotational center axis is largely decentered, which makes the precise following of a magnetic head (not shown) to the data track difficult.

A hard disk used as a recording medium for mobile equipment may require shock resistance, which guarantees a normal operation even after a shock beyond 1500 G is applied thereto at a state of not working. A construction for increasing the shock resistance is proposed as below. For example, in order to prevent the disk shift due to a strong shock, the frictional coefficient may be raised or the axial force of screw thread 4 may be increased in the disk apparatus as shown in FIG. 16 since the frictional force for fixing disk 1 needs to be increased. Therefore, the method for increasing the axial force has been conventionally adopted for reasons to be described below. That is, first of all, in addition to the demand for improvement of the precision in processing, the minuteness of the surface finish must be increased in order to prevent the adherence of burrs and/or contamination. Second, the disk shift due to the roughness of one surface of hub 2 and clamp member 3 or disk 1 (which increases the frictional coefficient) cannot be suppressed though the surface finish of hub 2, clamp member 3 and disk 1 is preferably minute since the technological developments tend to aim to reduce the amount of levitation more than the present amount of levitation of several tens of nano meter (nm) of the head above one side of disk 1. Furthermore, an increase in costs cannot be avoided even though the surface finish of the clamp area only excluding the data area can be rough technically. Therefore, the method for increasing the axial force has been adopted.

However, when shock resistance is increased by a large axial force, the repetitive runout of disk 1 is increased due to the clamping force caused when clamp member 3 is clamped. This means that the condition for increasing the shock resistance and the condition for resolving the repetitive runout of disk 1 due to the clamping force are mutually contradictory. Therefore, especially in the development of small disk apparatus, it is important that the improvement of shock resistance is compatible with the resolution of the repetitive runout especially in the development of a compact disk apparatus.

Furthermore, in order to minimize the repetitive runout of disk 1 due to an increase in clamping force, the center axis of disk pressing portion 3g must be coaxial with the center axes of disk receiving surface 2e of hub 2 and disk. The relationship will be described below with reference to the clamp structure in the conventional magnetic disk apparatus.

In FIG. 16, disk 1 is inserted into disk inserting portion 2a, which is the central projection of hub 2. One side of disk 1 is received by disk receiving surface 2e of hub 2. Clamp member 3 is mounted on the other side of disk 1 coaxially to disk 1 and is clamped between screw thread 4 and internal thread 2c at rotational axis 9 of hub 2. Since the diameter of screw head 4b of screw thread 4 is larger than the diameter of central hole 3a of clamp member 3 here, axial force occurs when screw thread 4 is clamped to internal thread 2c of rotational axis 9, which rotates on the inner circumferential surface of bearing sleeve 8. The axial force is transmitted from screw head face 4c to bottom face 3f near central hole 3a of clamp member 3, clamp member 3 coaxially and integrally fixes disk 1 to hub 2 with the other surface of disk 1 pressed in disk pressing portion 3g. Permanent magnet 7, which is a component of a motor for rotating hub 2, is fixed to the rim of hub 2. In order to use the magnetic force of the magnet of permanent magnet 7 effectively and suppress the leakage flux to the head, hub 2 is made from martensite steel.

In order to mount disk 1 and hub 2 coaxially, the central hole of disk 1 and the outer cylinder of hub inserting part 9a of rotational axis 9, which is slightly smaller than the diameter of the central hole of disk 1, are positioned and fitted to each other. Furthermore, in order to mount clamp member 3 and hub 2 coaxially, hub inserting portion 9a of rotational axis 9 and central hole 3a of clamp member 3, which has a slightly larger diameter than the diameter of hub inserting part 9a, are positioned and fitted to each other. The positioning may be achieved by placing hub inserting part 9a and clamp member 3 with a tab for engaging. The tab for engaging is provided such that clamp member 3 is not moved in the direction perpendicular to the central axis (that is, in the direction of the radius of disk 1). Clamp member 3 is bent for the thickness excluding the tab for engaging and is clamped by screw thread 4.

FIG. 17 is a section view showing a second example of the clamp structure in a conventional disk apparatus. The structure of the second example is different from that of the first example in that multiple screw threads 4 are provided on the circumference of clamp member 3 in order to suppress the runout in the rotational axis of disk 1 due to the inclination of clamp member 3.

While the above-described conventional disk apparatus has a construction including one disk only, a disk having recording areas on both sides or multiple disks may be used in order to achieve larger capacity. In a disk apparatus having multiple disks, the disks and spacers are alternately laminated between a hub and a clamp member, and the disks and spacers are pressed in the direction of the lamination by the outer area of the clamp member. Then, the disks and spacers are fixed to the hub. FIG. 18 is a section view showing a third example of the clamp structure in a conventional disk apparatus having multiple disks.

In FIG. 18, hub 121 can rotate around shaft 123 at bracket 122 through bearings 124 and 125. Rotor hub 126 is fixed to hub 121 and shaft 123. Stator 127 is attached to shaft 123, and rotor magnet 128 is attached to hub 121. The supply of current to the stator coil can rotate hub 121 along with rotor magnet 128. Disk 100 has direct contact with flange 129 of hub 121. Disk 110 and Disk 120 are fitted to hub 121 through spacer 130 before disk 100 and through spacer 131 before disk 100, respectively. Disk 120 is fitted to hub 121 by sandwiching spacer 131 with disk 110. Clamp 132 is fitted to rotor hub 126 and is fixed to hub 121 by screw thread 133. Clamp 132 presses disks 100, 110 and 120 and spacers 130 and 131 toward flange 129 and fixes them to hub 121. Flange 129 has projection 121a. This projection 121a is positioned on the outer side than the contact point between spacer 130 and disk 100, which is produced by the attachment of clamp 132 thereto, and on the surface of flange 129 facing toward disk 100. This projection 121a causes bending moment $M_1$ in the opposite direction of the bending moment, which tries to deform the disk so that the disk can be maintained flat (see Japanese Patent Unexamined Publication No. H6-139675, for example).

In the conventional disk apparatus as described above, the recent increasing improvement of disk recording density has a problem that data cannot be read because a track shift is caused by displacement of the clamp member due to a change in temperature. In order to resolve the problem, a method has been proposed in which a clamp member and/or a disk spacer contain a material having a linear expansion coefficient substantially equal to that of a disk (see Japanese Patent Unexamined Publication No. H6-168536 and Japanese Patent Unexamined Publication No. 2002-133743, for example).

Furthermore, in order to build a disk apparatus in mobile equipment, more decrease in thickness of the apparatus itself has been demanded. In order to decrease the thickness, the thickness of a disk may be decreased, or a head for writing/reading may be placed on one side of the disk only. Alternatively, the recording capacity of one disk may be increased.

However, the construction of the first example has a problem that the direction and amount of a warp of the disk caused by the clamping of the disk cannot be controlled in a stable manner. Then, another problem occurs that the amount of levitation of the head is not stable, and, in a worst case, the head touches the disk.

The construction of the other proposed second example, that is, the clamping method in which disk 1 is fixed to hub 2 with multiple screw threads 4 has another problem that clamping screw threads 4 deforms a clamper or causes uneven disk pressing force. As shown in FIG. 19, another problem occurs that distortions and/or undulations, the number of which is equal to the number of screw threads, occur in the inner part of the disk. FIG. 19 is a diagram showing a deformation of a disk due to the clamping in a conventional disk apparatus.

The thickness of a disk itself tends to be decreased with decreases in thickness of the apparatus in recent years. As a result, the strength of a disk is decreased, and the distortion and/or undulation is/are increased in the direction of the circumference of the disk. Furthermore, the amount of warping is increased in the direction of the radius of the disk. The distortion and/or undulation of the inner part of the disk causes a change in levitation gap between head 20 and disk 1 instantly in the inner part of the disk while the disk apparatus is operating. For example, when three screws are used to clamp clamp member 3, a change occurs in head output in accordance with the number of screws every rotation of disk 1 as shown in FIG. 20. The percentage value of the value resulting from the division of the minimum value of the head output by the maximum value is called modulation. A small modulation deteriorates S/N of a read output signal in accordance with a change in output wave thereof, and an increase in time jitter of data reading pulses reduces the error rate, resulting in inaccurate data writing/reading. Furthermore, the positioning of head 20 to a target track and/or data writing/reading cannot be performed accurately. Still further, there is another problem that a decrease in amount of levitation causes a failure such as a contact between disk 1 and the head. FIG. 20 is a head signal output diagram in a conventional disk apparatus.

In the method in which the clamp member and disk spacer contain a material having a linear expansion coefficient substantially equal to that of a disk, the expansions and contradictions due to changes in temperature of a disk and the clamp member and disk spacer occur in a same manner, but, since the linear expansion coefficient of the hub containing a different material from that of a disk is larger than the linear expansion coefficient of the disk, distances Rh and Rs are changed where distance Rh is a distance from the rotational axis center of the motor to a contact point or plane between the hub and a disk, and distance Rs is a distance from the rotational axis center of the motor to a contact point or plane between the disk and the spacer ring, which are produced by the attachment of the clamp member. As a result, the amount and direction of warp of the disk change.

For example, when disk 1 is adjusted to be substantially flat without a warp as shown in FIG. 21A at a normal temperature (25° C.), distance Rh from the rotational axis center to the contact position between disk 1 and hub 2 to and distance Rs from the rotational axis center to the contact position between disk 1 and clamp member 3 side change relatively upon change in ambient temperature because of differences from the linear expansion coefficient (9.2 to $12\times10^{-6}$) of hub 2 of martensite SUS and the linear expansion coefficient (6 to 7.2 to $\times10^{-6}$ for glass and about $23.5\times10^{-6}$ for aluminum) of clamp member 3, for example, of glass or aluminum. In other words, when the material of disk 1 is glass, distance Rh from the rotational axis center to the contact position between disk 1 and hub 2 moves to the outer part than distance Rs from the rotational axis center to the contact position between disk 1 and clamp member 3 since the growth rate of hub 2 is larger than the growth rate of clamp member 3 at a high temperature. Thus, disk 1 warps toward clamp member 3 in the direction of the outer circumference of disk 1 as shown in FIG. 21B. On the other hand, when the material of disk 1 is aluminum, distance Rs from the rotational axis center to the contact position between disk 1 and clamp member 3 to moves to the outer part than distance Rh from the rotational axis center to the contact position between disk 1 and hub 2 since the growth rate of clamp member 3 is larger than the growth rate of hub 2 at a high temperature similarly. Thus, disk 1 warps toward hub 2 in the direction of the outer circumference of disk 1 as shown in FIG. 21C. Conversely, in an environment at a low temperature, the opposite phenomenon of that at a high temperature occurs. Therefore, since the direction of the warp of the disk depends on changes in material and temperature, the levitation state of the head changes, resulting in a failure in writing/reading operations of the head disadvantageously.

On the other hand, in the construction of the disk apparatus including multiple disks, the hub is deformed by pressure applied by the clamp, and the disks are deformed in the direction of the diameter and warp. A smaller disk apparatus has a smaller spindle motor, a less stiff hub and a thinner disk, which produces larger deformation. In order to achieve larger capacity, not only the recording density of data on the disk but also the resolution of data recording must be increased, and the amount of levitation of the head therefore is significantly smaller. Furthermore, for a disk having a smaller diameter, the area for clamping the disk is shifted toward the inner radius. Therefore, the degree that the disk deforms tends to increase more.

The clamp structure in a conventional disk apparatus including multiple disks as shown in FIG. 18 has projection 121a at flange 129 such that projection 121a can be positioned on the outer side than the contact point between spacer 130 and disk 100, which is produced by the attachment of clamp 132. Because of projection 121a, the bending moment $M_1$ is caused in the opposite direction of the bending moment trying to deform the disk so that the disk can be maintained flat. Furthermore, although the clamp structure in the construction considers to keep the deformation of the disks small or to keep the deformation of the disks caused by a change in environmental temperature small, the complete elimination of the deformation of a disk is significantly difficult with the disk securely maintained flat. Furthermore, the disks have a small deformation, a sufficient head output cannot be obtained in some direction of the deformation, which is another problem.

Furthermore, in the clamp structure in the conventional disk apparatus, the amount of deformation and/or warp of the disks caused by clamping are increased with a decrease in thickness of the disks. Therefore, the recording capacity may not be increased, and the stable levitation of the head cannot be achieved.

DISCLOSURE OF THE INVENTION

The invention was made in order to solve the problems, and it is an object to provide a disk apparatus having a clamp structure for a disk, whereby the amount and direction of deformation of the disk, which is caused by clamping, are defined, and the head can levitate in a stable manner. Thus, a decrease in head output can be prevented, and the stability and reliability of head output can be improved. Furthermore, the disk apparatus has a fixing structure to the spindle of the disk, which can prevent the occurrence of the distortion of the disk, is stable independently of changes in temperature, and can allow a decrease in thickness and an increase in capacity easily.

In order to achieve the object, there is provided a disk apparatus including a hub having a disk inserting portion having a cylindrical plane in the outer part of one end and a disk receiving portion having a flat part and being pivotably supported, a head facing toward at least one face of a disk-shaped recording medium having an inner hole through which the disk inserting portion is fitted, levitating and scanning above the disk-shaped recording medium and reading a signal recorded on the disk-shaped recording medium or writing a signal on the disk-shaped recording medium, and a clamp unit holding the disk-shaped recording medium with the disk receiving portion, wherein the disk receiving portion has an inclined or declined plane. The clamp unit may have a clamp member and multiple screw threads, clamp the clamp member mounted on the top face of the hub with the multiple screw threads, and hold the disk-shaped recording medium by using the clamp member. In addition, the form of the center part of the disk-shaped recording medium may have a convex form with respect to the side having the head. The relationship between distances Rh and Rs is Rs>Rh when the head is provided on the disk receiving portion side of the hub with respect to the disk-shaped recording medium and is Rs<Rh when the head is provided on the clamp member side where Rh is a distance from the rotational axis center to the contact point or contact plane between the hub and the disk-shaped recording medium, and Rs is a distance from the rotational axis center to the contact point or contact plane between the disk-shaped recording medium and the clamp member, which are produced by the attachment of the clamp member.

Because of the construction, in the disk apparatus having a head for writing/reading on one side of the disk only, the form of the disk can be a convex form with respect to the side having the head. Thus, stable head levitation can be achieved, and the contact between the head and the disk can be prevented. Furthermore, the flat form of the disk receiving portion has a convex form with respect to the side having the head. Thus, the form of the disk can be convex with respect to the side having the head in the simple construction. Alternatively, in the relationship between distance Rh from the rotational axis center to the contact point or contact plane between the hub and the disk and distance Rs from the rotational axis center to the contact point or contact plane between the disk and the clamp member, which are produced by holding the disk, in the disk apparatus of the invention, the convex form of the disk can be obtained by increasing one on the side having the head with respect to the disk. Thus, stable head levitation can be achieved, and the contact between the head and the disk can be prevented.

In the construction of the disk apparatus of the invention, the clamp unit may have a spacer ring, a clamp member and multiple screw threads, clamp the clamp member mounted on the top face of the hub with the multiple screw threads, and hold the disk-shaped recording medium and the spacer ring by using the clamp member. The relationship between distances Rh and Rs is Rs>Rh when the head is provided on the disk receiving portion side of the hub with respect to the disk-shaped recording medium and is Rs<Rh when the head is provided on the spacer ring side where Rh is a distance from the rotational axis center to the contact point or contact plane between the hub and the disk-shaped recording medium, and Rs is a distance from the rotational axis center to the contact point or contact plane between the disk-shaped recording medium and the spacer ring, which are produced by the attachment of the clamp member. In addition to the construction, the spacer ring may have level changes on a part of the side to be in contact with the disk-shaped recording medium. The spacer ring may have elevation changes on the surface to be in contact with the disk-shaped recording medium and the surface to be in contact with the clamp member. The spacer ring may contain a material of a Vickers hardness of 500 or higher and a Young's modulus of 200000 N/mm$^2$ or higher. The flatness of the spacer ring may be 5 µm or lower.

In this construction, the disk is fixed through not only a normally used clamp member but also a spacer ring. Thus, fixing the disk to the hub through the spacer ring, which can provide flatness in a simple form, can reduce the deformation of the disk. Furthermore, the equal or substantially equal linear expansion coefficient or coefficients of the hub and spacer ring does not easily change, independently of a change in ambient temperature, the positional relationship between distance Rh from the rotational axis center of a motor to the contact point or contact plane between the hub and the disk and distance Rs from the rotational axis center of the motor to the contact point or contact plane between the disk and the spacer ring, which are produced by the attachment of a clamp member. As a result, the change in a warp in the direction of the radius of the disk due to a temperature change can be small, and the amount of levitation of the head can be stabilized. The form of the disk can be changed to a convex form with respect to the side having the head independently of the flat form of the disk receiving portion by increasing one having the head with respect to the disk between distance Rh from the rotational axis center to the contact point or contact plane between hub and disk and distance Rs from the rotational axis center to the contact point or contact plane between the disk and the spacer ring, which are produced by holding the disk with the clamp member through the spacer ring. Furthermore, independently of a working temperature atmosphere, the head levitation can be stabilized, and the contact between the head and the disk can be prevented. Still further, the areas where the disk and clamp member are in contact with each other can be small, which can increase the precision of the flatness of the contact planes. In addition, the clamp member is elastically deformed, and the elastic force of which can press the disk against the disk receiving portion of the hub through the spacer ring. Also, a warp of the disk does not cause an unnecessary distortion of the disk.

In the construction of the disk apparatus of the invention, in order to achieve the object, the head may have, in the direction of the radius of the disk-shaped recording medium, a head element in the center part and an air bearing rail on both ends, and the distance between the surface of the disk-shaped recording medium and the head element may be larger than the distance between the surface of the disk-shaped recording medium and the air bearing rail.

This construction allows the distance between the air bearing rails on both ends of the head in the direction of the radius of the disk and the surface of the disk facing thereto to be larger than the distance between the head element substantially in the center part of the head and the surface of the disk facing thereto even when, in the direction of the radius of the disk, the surface of the head facing to the disk is flat or convex toward the disk side. Thus, stable head levitation and head output can be obtained, and the contact between the head and the disk can be prevented. Furthermore, even with a thinner disk, stable head levitation and head output can be obtained. As a result, a decrease in thickness and an increase in capacity are allowed in the disk apparatus.

Figure 1:
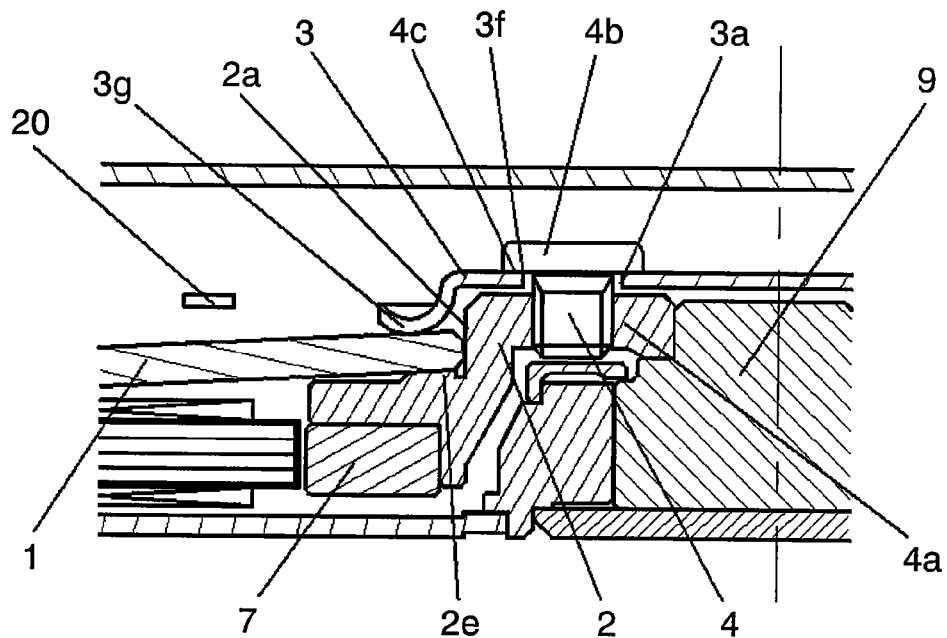
FIG. 1 is a partial section view showing a schematic structure of a disk apparatus according to Embodiment 1 of the invention.

DESCRIPTION OF REFERENCE NUMERALS AND SIGNS 1, 100, 110, 120 Disk (Disk-Shaped Recording Medium)
2, 121 Hub
2a Disk Inserting Portion (Central Projection)
2c Internal thread 2e Disk Receiving Portion
3 Clamp Member
3a Central Hole
3f Bottom Face
3g, 3h Disk Pressing Portion
4 Screw Thread
4a Internal Thread Portion
4b Screw Head Part
4c Screw Head Face
6 Spacer Ring
6a, 6e Contact plane
6b, 6d Elevation Change
7 Permanent Magnet
8 Bearing Sleeve
9 Rotational Axis Portion
9a Hub Inserting Portion
9c Rotational Axis Center
20 Head
20a Air Bearing Rail
20b Center Rail
21, 22 Contact Point
121a Projection
122 Bracket
123 Shaft
124, 25 Bearing
126 Rotor Hub
127 Stator
128 Rotor Hub
129 Flange
130, 131 Spacer
132 Clamp

DETAILED DESCRIPTION OF THE PREFERRED EMBODIMENTS

Embodiments of the invention will be described below with reference to drawings.

Embodiment 1

Figure 2:
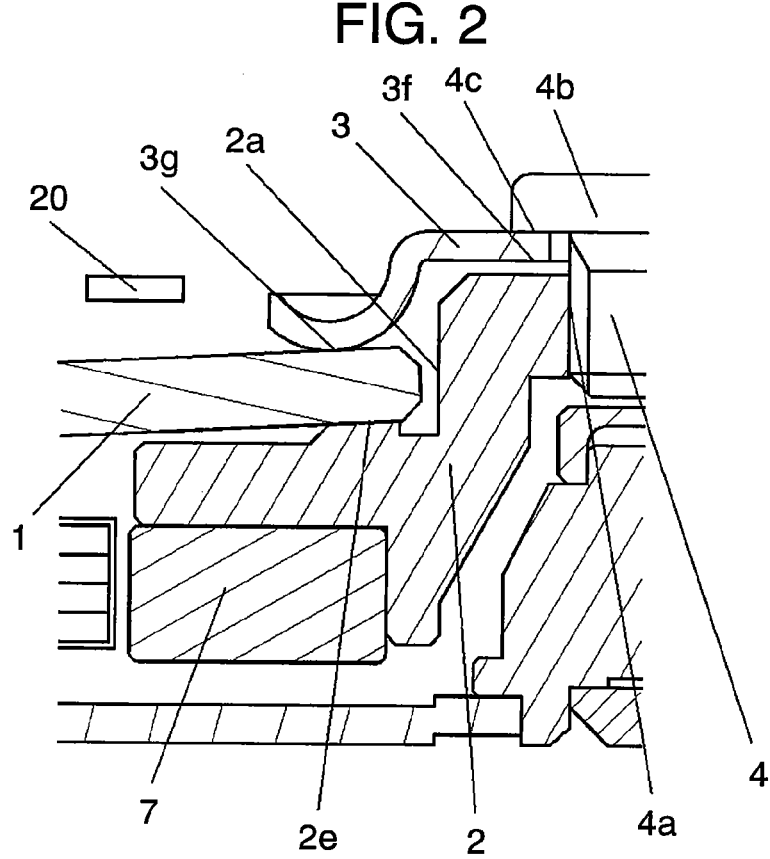
FIG. 2 is an enlarged section view showing a clamp structure of the disk apparatus according to Embodiment 1 of the invention.
Figure 3:
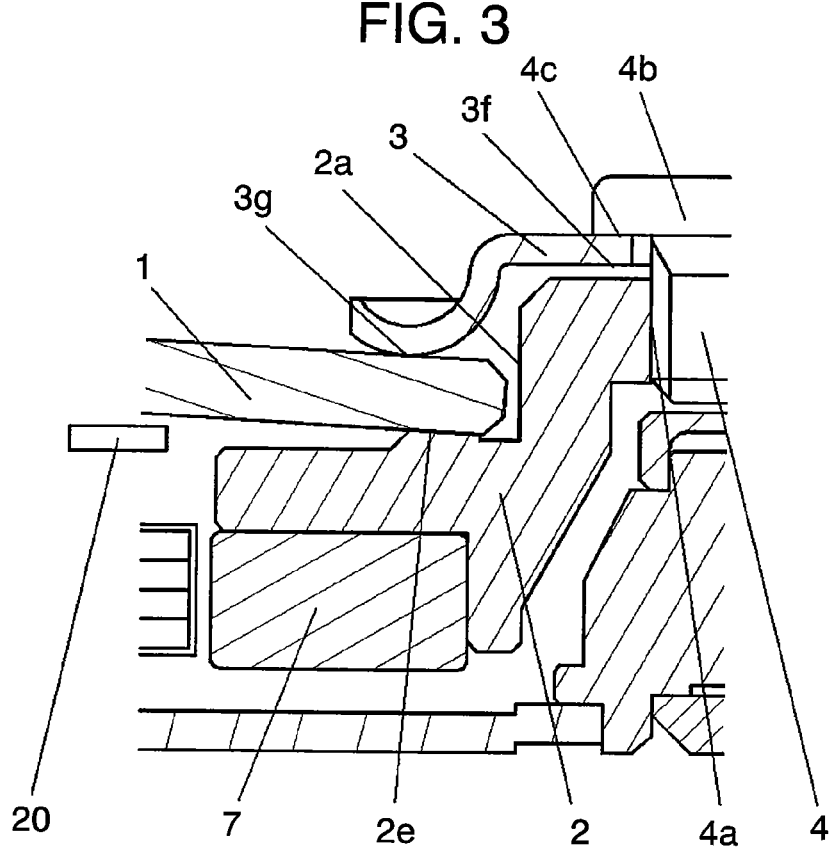
FIG. 3 is an enlarged section view showing a clamp structure of another disk apparatus according to Embodiment 1 of the invention.
Figure 16:
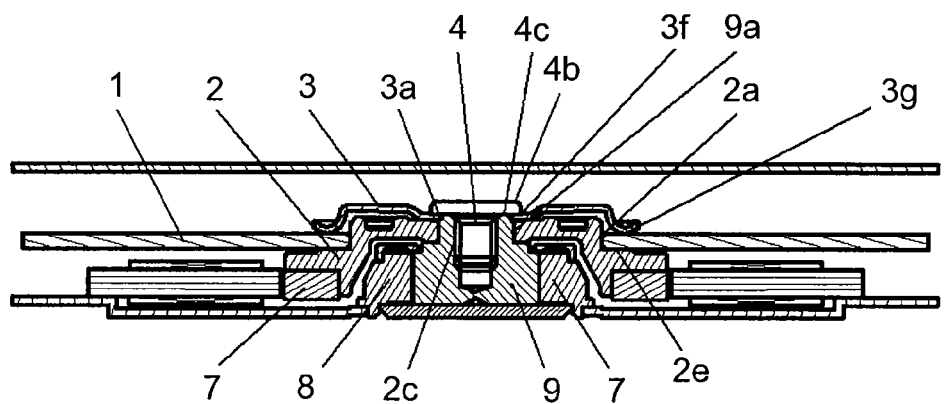
FIG. 16 is a section view showing a first example of the clamp structure of a conventional disk apparatus.
Figure 17:
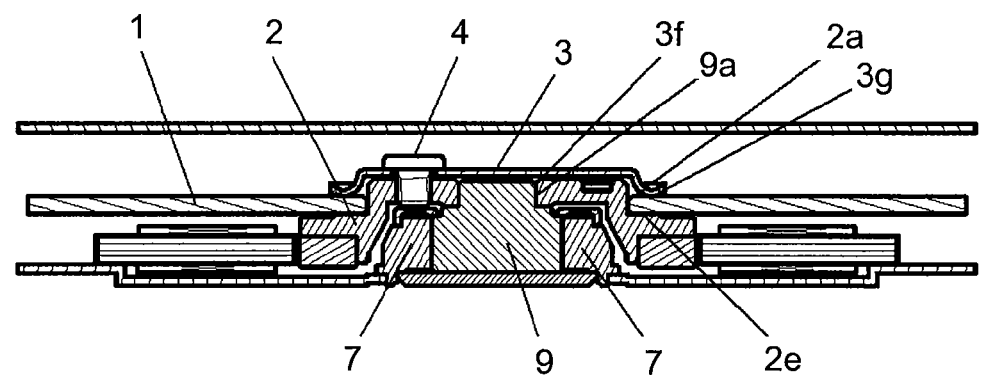
FIG. 17 is a section view showing a second example of the clamp structure of a conventional disk apparatus.
Figure 18:
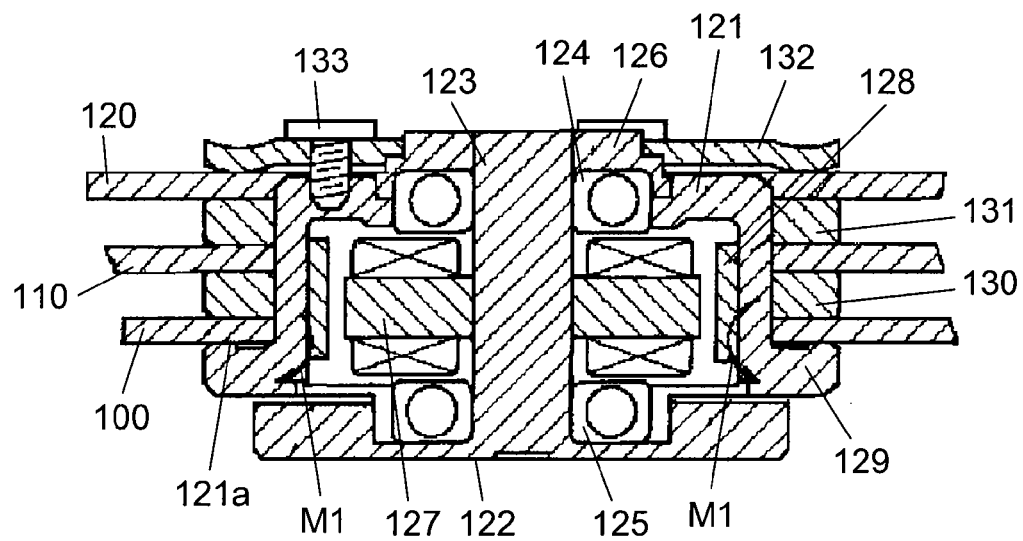
FIG. 18 is a section view showing a third example of the clamp structure of a conventional disk apparatus including multiple disks.
Figure 19:
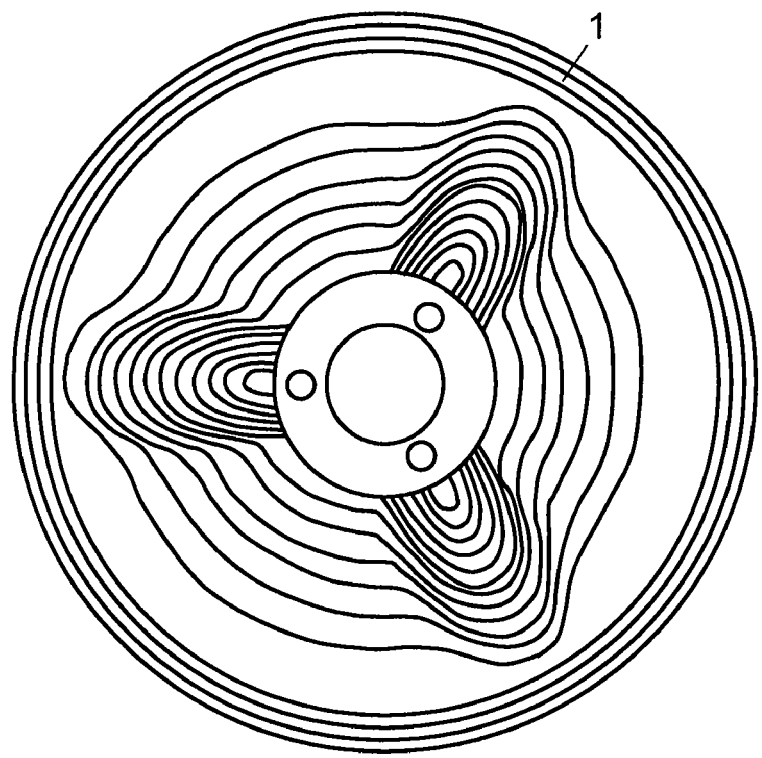
FIG. 19 is a diagram showing a deformation of a disk, which is caused by clamping in a conventional disk apparatus.
Figure 20:
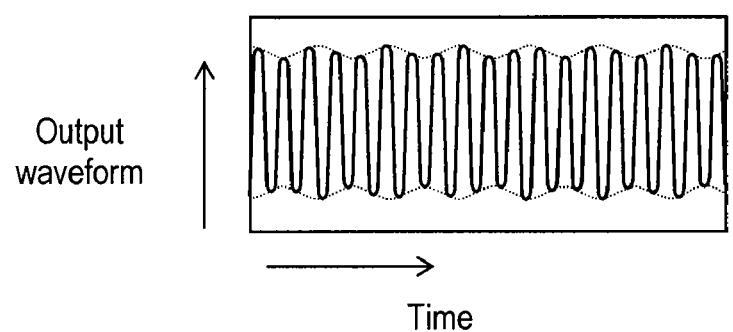
FIG. 20 is a diagram showing signal outputs from the head of a conventional disk apparatus.
Figure 21A:
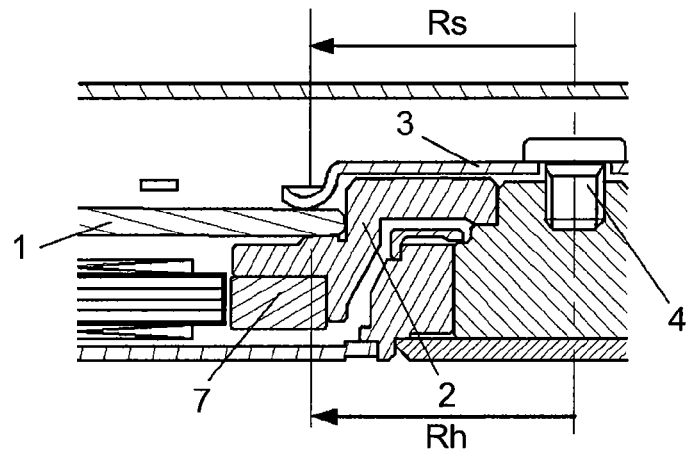
FIG. 21A is a section view showing a deformation state of a disk, which is caused by clamping at a normal temperature in a conventional disk apparatus.
Figure 21B:
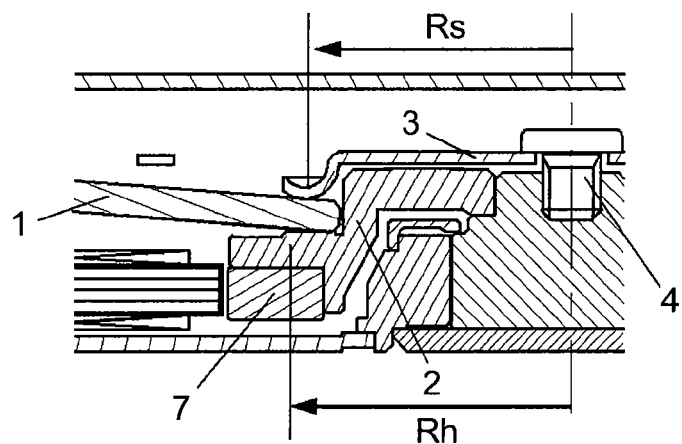
FIG. 21B is a section view showing a deformation state of a disk, which is caused by clamping at a high temperature in the conventional disk apparatus.
Figure 21C:
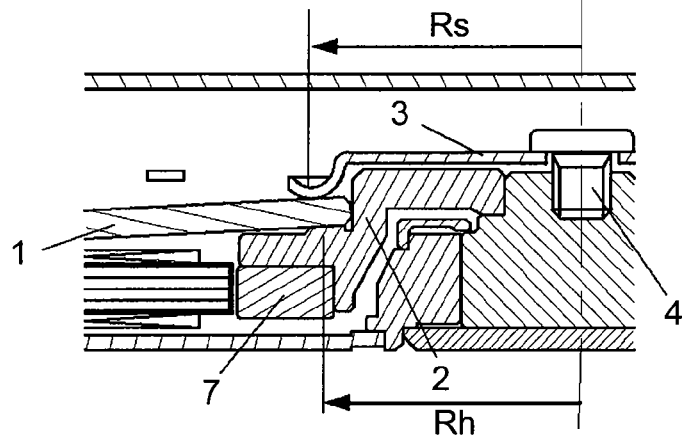
FIG. 21C is a section view showing a deformation state of a disk, which is caused by clamping at a low temperature in a conventional disk apparatus.

A disk apparatus according to Embodiment 1 of the invention will be described with reference to FIGS. 1 to 3. FIG. 1 is a partial section view showing a schematic structure of a disk apparatus according to Embodiment 1 of the invention. FIG. 2 is an enlarged section view showing a clamp structure of the disk apparatus according to Embodiment 1 of the invention. FIG. 3 is an enlarged section view showing a clamp structure of another disk apparatus according to Embodiment 1 of the invention. In FIGS. 1 to 3, the same reference numerals are given to the same components as those in FIGS. 16 and 17, which describe the construction of a conventional disk apparatus.

In FIGS. 1 and 2, disk-shaped recording medium 1 (where a disk-shaped recording medium is abbreviated to disk hereinafter) having a hole in the inner part is inserted to disk inserting portion 2a cylindrically projecting from hub 2. One face of disk 1 is received by the top face of disk receiving portion 2e in the outer side of disk inserting portion 2a of hub 2. This disk receiving portion 2e declines by a predetermined angle toward the outer part in the direction of radius. In the construction shown in FIGS. 1 and 2, the outer side of disk receiving portion 2e in the direction of the radius declines. Clamp member 3 containing a same material as that of hub 2 or a material having a closer linear expansion coefficient to that of the material of hub 2 has an inner hole through which disk inserting portion 2a of hub 2 is inserted like disk 1 and is mounted above the other face of disk 1. Here, clamp member 3 holds disk 1 and is clamped by screw threads 4 at multiple internal thread portions 4a on hub 2. The multiple screw threads and clamp member 3 function as a clamp unit for clamping disk 1. In this case, since the diameter of screw head part 4b of screw thread 4 is larger than the diameter of a hole in clamp member 3, an axial force occurs when screw thread 4 is clamped to internal thread portions 4a on hub 2. The axial force is conducted from screw head face 4c to bottom face 3f near the hole of clamp 3, and clamp member 3 coaxially and integrally fixes disk 1 to hub 2 with disk pressing portion 3g holding the other face of disk 1. Furthermore, head 20 facing toward one flat part of disk 1 is provided which levitates and scans above disk 1, reads a signal recorded on disk 1 or writes a signal on disk 1. Permanent magnet 7, which is a component of a motor for rotating hub 2, is fixed on the outer part of hub 2. Hub 2 contains a martensite steel material in order to use the magnetic force of the magnet of this permanent magnet 7 effectively and to suppress the leakage flux to head 20.

Here, since the flat form of disk receiving portion 2e has a convex form with respect to the position of head 20, disk 1 is pressed to disk receiving portion 2e by the axial force and deforms in accordance with the form of disk receiving portion 2e. In other words, in the case in FIGS. 1 and 2, disk receiving portion 2e has an umbrella-like form with the outer side in the direction of the radius declined, and disk 1 has therefore a convex form with respect to the position of head 20.

In the disk apparatus according to Embodiment 1 of the invention, since disk 1 is clamped and is thereby deformed to a convex form with respect to head 20, the distance between head 20 and the position on the outer side of disk 1 is large in comparison with the height of the center part of disk 1 and the height of levitation of head 20. Thus, the end of head 20 does not touch disk 1 basically when head 20 levitates from disk 1. Therefore, the simple construction as shown in FIGS. 1 and 2 allows stable head levitation and can prevent contact between head 20 and disk 1. In this construction, the declining angle of disk receiving portion 2e is defined as required to prevent contact between the end of the outer part of hub 2 and the bottom face of disk 1.

Having described the disk apparatus according to Embodiment 1 of the invention with reference to the disk apparatus including head 20 for writing/reading a signal on the clamping side, that is, above disk 1, for example, head 20 for writing/reading a signal may be provided on the hub side, that is, below disk 1 as shown in FIG. 3. In this case, the form of the upper face of hub 2 may be a cone shape in which the part receiving and being in contact with disk 1 on the upper face of disk receiving portion 2e inclines in the opposite direction of the one shown in FIGS. 1 and 2, that is, the outer part of disk receiving portion 2e in the direction of the radius moves upward. In the disk apparatus having the construction, since the inner part, which is opposite of that in FIGS. 1 and 2, of disk 1 is deformed to a convex form by clamping with respect to head 20, the distance between head 20 and the outer part of disk 1 is large in comparison with the positional height of the center part of disk 1 and the height of levitation of head 20. Thus, the end of head 20 does not touch disk 1 basically when head 20 levitates from disk 1. Therefore, the simple construction as shown in FIG. 3 allows stable head levitation and can prevent contact between head 20 and disk 1.

Embodiment 2

Figure 4:
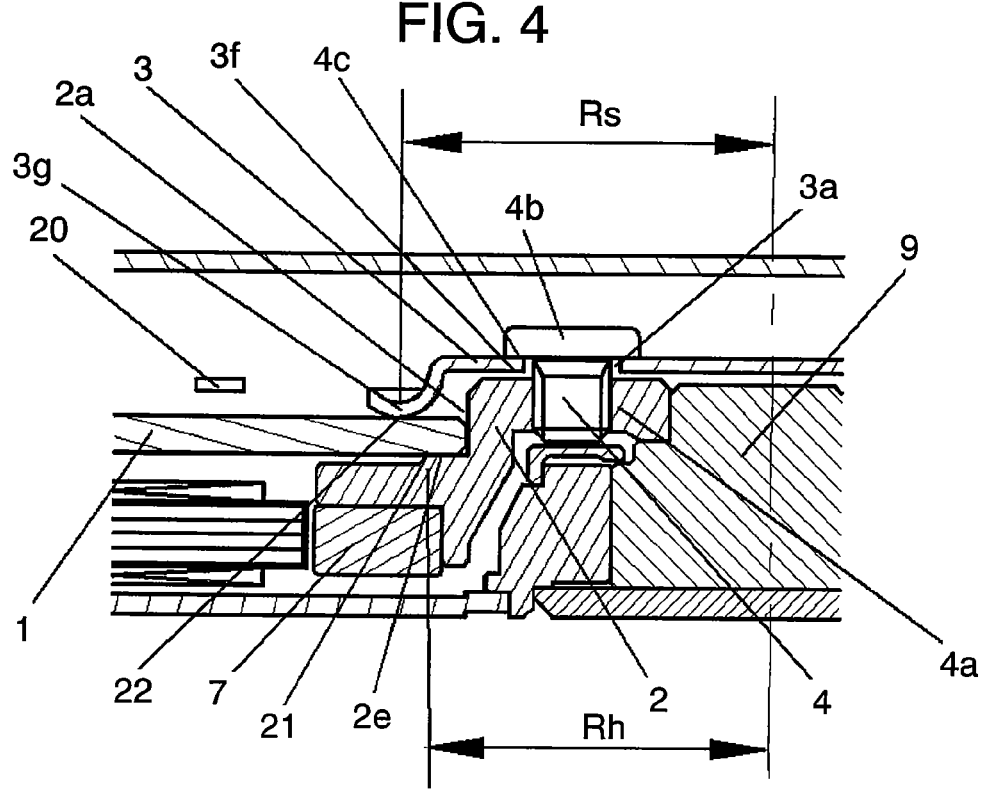
FIG. 4 is a partial section view showing a schematic structure of a disk apparatus according to Embodiment 2 of the invention.
Figure 5:
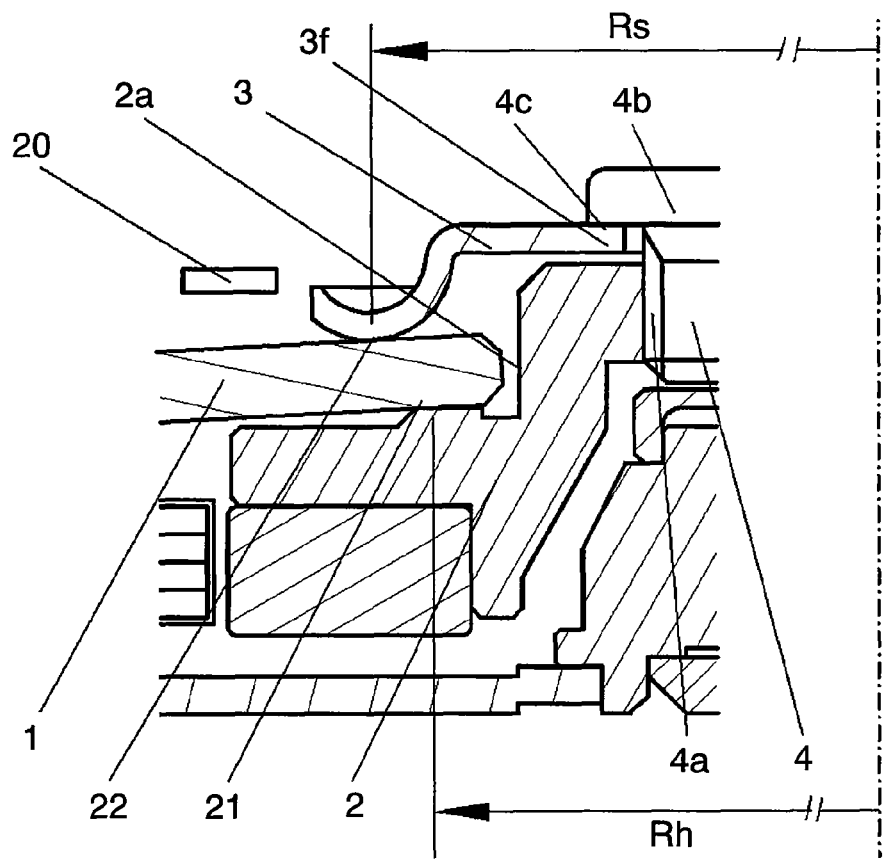
FIG. 5 is an enlarged section view showing a clamp structure of the disk apparatus according to Embodiment 2 of the invention.
Figure 6:
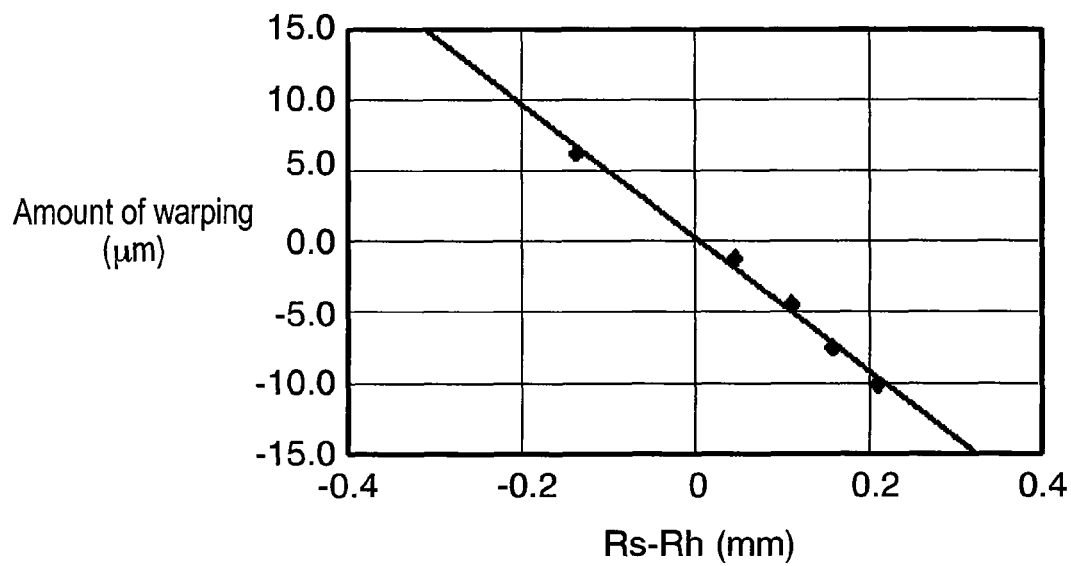
FIG. 6 is a correlation diagram showing a relationship between distance Rs from rotation axis center to contact point of a clamp member and a disk and contact point Rh between the disk and a hub and amounts of warps of the disk, which are produced by clamping the disk.
Figure 7:
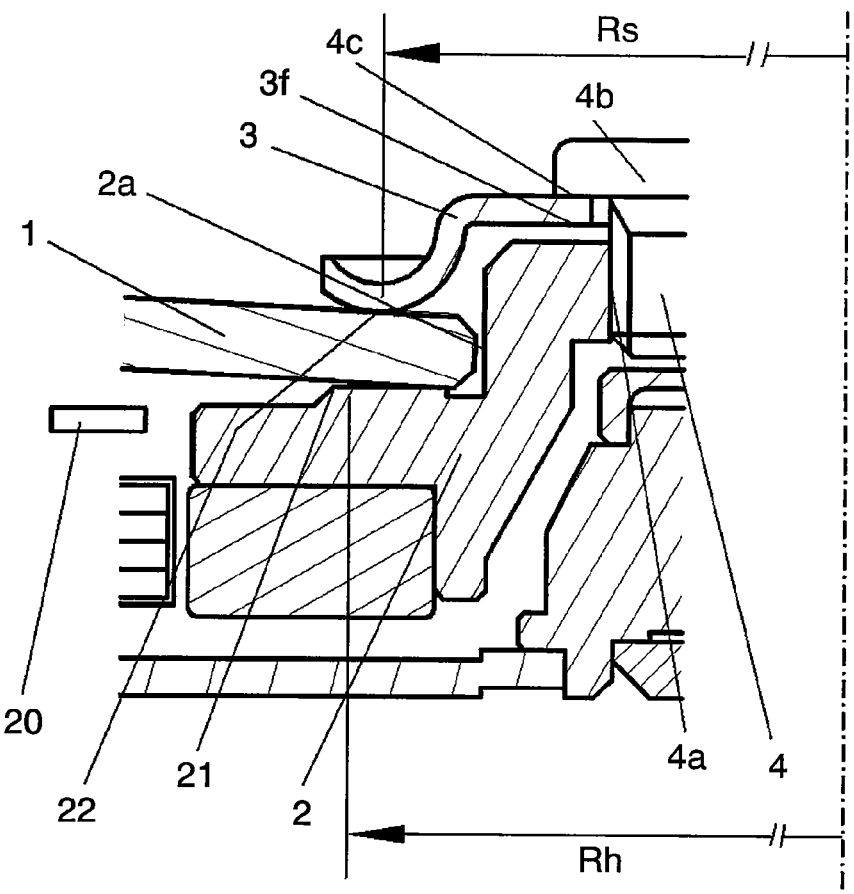
FIG. 7 is an enlarged section view showing a clamp structure of another disk apparatus according to Embodiment 2 of the invention.

Next, a disk apparatus according to Embodiment 2 of the invention will be described with reference to FIGS. 4 to 7. FIG. 4 is a partial section view showing a schematic structure of a disk apparatus according to Embodiment 2 of the invention. FIG. 5 is an enlarged section view showing a clamp structure of the disk apparatus according to Embodiment 2 of the invention. FIG. 6 is a correlation diagram showing a relationship between distance Rh and distance Rs and amounts of warps of the disk, which are produced by clamping the disk. FIG. 7 is an enlarged section view showing a clamp structure of another disk apparatus according to Embodiment 2 of the invention. In FIGS. 4, 5 and 7, the same reference numerals are given to the same components as those in FIGS. 1, 2 and 3, which describe the construction of the disk apparatus according to Embodiment 1 of the invention.

In FIGS. 4 and 5, disk 1 having a hole in the inner part is inserted to disk inserting portion 2a cylindrically projecting from hub 2. One face of disk 1 is received by the top face of disk receiving portion 2e projecting in a convex shape in the outer part of disk inserting portion 2a of hub 2. Clamp member 3 containing a same material as that of hub 2 or a material having a closer linear expansion coefficient to that of the material of hub 2 has an inner hole through which disk inserting portion 2a of hub 2 is inserted like disk 1 and is mounted above the other face of disk 1. Here, clamp member 3 holds disk 1 and is clamped by screw threads 4 at multiple internal thread portions 4a on hub 2. The multiple screw threads and clamp member 3 function as a clamp unit for clamping disk 1. In this case, since the diameter of screw head part 4b of screw thread 4 is larger than the diameter of a hole in clamp member 3, an axial force occurs when screw threads 4 are clamped to internal thread portions 4a on hub 2. The axial force is conducted from screw head face 4c to bottom face 3f near the hole of clamp member 3, and clamp member 3 coaxially and integrally fixes disk 1 to hub 2 with disk pressing portion 3g holding the other face of disk 1. Furthermore, head 20 facing toward one flat part of disk 1 is provided which levitates and scans above disk 1, reads a signal recorded on disk 1 or writes a signal on disk 1. Permanent magnet 7, which is a component of a motor for rotating hub 2, is fixed on the outer part of hub 2. Hub 2 contains a martensite steel material in order to use the magnetic force of the magnet of this permanent magnet 7 effectively and to suppress the leakage flux to head 20.

Here, holding disk 1 produces contact point 21 or a contact plane between disk receiving portion 2e of hub 2 and the bottom face of disk 1 and contact point 22 or contact plane between the top face of disk 1 and disk pressing portion 3g of clamp member 3. The direction and amount of a warp of disk 1 are defined by the dimensions of Rh and Rs where Rh and Rs are distances from rotational axis center 9c to contact points 21 and 22, respectively. The relationship between the amount of a warp and Rh and Rs may be as shown in FIG. 6, for example, though it depends on the material, form and temperature of disk 1, hub 2 and clamp member 3. In the construction of the disk apparatus according to Embodiment 2 of the invention, the distance on the side having head 20 is defined to be larger with respect to disk 1, that is, to satisfy the relationship below:

$$Rs > Rh \quad \text{(Equation 1)}$$

The direction and amount of a warp of disk 1 can be controlled by adjusting the relationship between Rs and Rh by using the graph shown in FIG. 6.

Thus, in the disk apparatus according to Embodiment 2 of the invention, the distance on the side having head 20 with respect to disk 1 is increased in the relationship between distance Rh from rotational axis center 9c to contact point 21 or contact plane between hub 2 and disk 1 and distance Rs from rotational axis center 9c to contact point 22 or contact plane between disk 1 and clamp member 3, which are produced by holding disk 1. Therefore, the disk has a convex form by the clamping with respect to head 20. Since the distance between head 20 and the position on the outer side of disk 1 is large in comparison with the height of the position at the center part of disk 1 and the height of levitation of head 20. Therefore, the end of head 20 does not touch disk 1 basically as far as head 20 levitates from disk 1. As a result, the simple construction as shown in FIGS. 4 and 5 allows stable head levitation and can prevent contact between head 20 and disk 1. Also in this construction, the positions of contact points 21 and 22 must be defined as required such that the contact between the end of hub 2 on the outer side and the bottom face of disk 1 can be prevented.

The positional relationship between distance Rh and distance Rs does not change easily independently of a change in ambient temperature when hub 2 and clamp member 3 contain a same material or when hub 2 and clamp member 3 contain materials having equal or substantially equal linear expansion coefficients where distance Rh is a distance from rotational axis center 9c of a motor to contact point 21 or contact plane between disk receiving portion 2e of hub 2 and the top face of disk 1, and distance Rs is a distance from rotational axis center 9c of the motor to contact point 22 or contact plane between the bottom face of disk 1 and clamp member 3, which are produced by the attachment of clamp member 3. Here, since the warp in the direction of the radius of disk 1, which is caused by clamping of disk 1, depends on the positional relationship between Rh and Rs, the change in amount of the warp in the direction of the radius can be reduced independently of the change in ambient temperature atmosphere of the disk apparatus according to Embodiment 2 of the invention. Therefore, the small change in amount of the warp of disk 1 in the direction of the radius due to a change in temperature can produce a constant direction and amount (angle) of the warp of disk 1 in the direction of the radius, which stabilizes the amount of levitation of head 20.

Having described the disk apparatus according to Embodiment 2 of the invention in which hub 2 and clamp member 3 contain materials having substantially equal linear expansion coefficients as described above, for example, the disk apparatus according to Embodiment 2 of the invention is not limited to the example. In addition to the example, the relationship between Rh and Rs at a normal working temperature (25° C.) may be determined such that the amount of the warp of disk 1 can be zero at −20° C. when β>α and the operation-guaranteed temperature of the disk apparatus is −20° C. to 80° C. where the linear expansion coefficient of hub 2 is α/° C., the linear expansion coefficient of clamp member 3 is β/° C., and the schematic radius of the clamping position is R (which may be defined as R=(Rs+Rh)/2). In other words, when $$Rs - Rh \geq (25-(-20)) \times (\beta-\alpha) \times R = 45 \times (\beta-\alpha) \times R \quad \text{(Equation 2)}$$

is defined, the direction of the warp of disk 1 is always one direction at a temperature in the range of the operation-guaranteed temperatures. Conversely, if the relationship between Rh and Rs at the normal working temperature (25° C.) is defined as:

$$Rs - Rh \geq (80-(-25)) \times (\alpha-\beta) \times R = 55 \times (\alpha-\beta) \times R \quad \text{(Equation 3)}$$

in the same manner where the linear expansion coefficients of the component parts are α>β, the direction of the warp of disk 1 is always one direction. Therefore, the materials of hub 2 and clamp member 3 do not have to have an equal or substantially equal linear expansion coefficient.

Furthermore, having described the disk apparatus according to Embodiment 2 of the invention by using the disk apparatus having head 20 for writing/reading signals on the clamp side, that is, above disk 1, as an example, the disk apparatus may have head 20 for writing/reading a signal on the hub side, that is, below disk 1. In this case, the relationship between distances Rh and Rs, which are distances from rotational axis center 9c to contact points 21 and 22, respectively, may be defined to satisfy the relationship below:

$$Rh>Rs \quad \text{(Equation 4)}$$

In the same manner, the direction and amount of the warp of disk 1 can be controlled by adjusting the relationship between Rs and Rh by using the graph shown in FIG. 6.

In this way, also in the disk apparatus having the construction, the distance on the side having head 20 is larger with respect to disk 1 in the relationship between distance Rh from the rotational axis center 9c to contact point 21 or contact plane between hub 2 and disk 1 and distance Rs from the rotational axis center 9c to contact point 22 or contact plane formed between disk 1 and clamp member 3, which are produced by holding disk 1. Then, the clamping deforms disk 1 to a convex form, which is opposite to the one in FIGS. 4 and 5, with respect to head 20. Thus, the distance between head 20 and the position on the outer side of disk 1 is large in comparison with the height of the center part of disk 1 and the height of levitation of head 20. Therefore, the end of head 20 does not touch disk 1 basically when head 20 levitates from disk 1. As a result, the simple construction as shown in FIG. 7 allows stable head levitation and can prevent contact between head 20 and disk 1.

Embodiment 3

Figure 8:
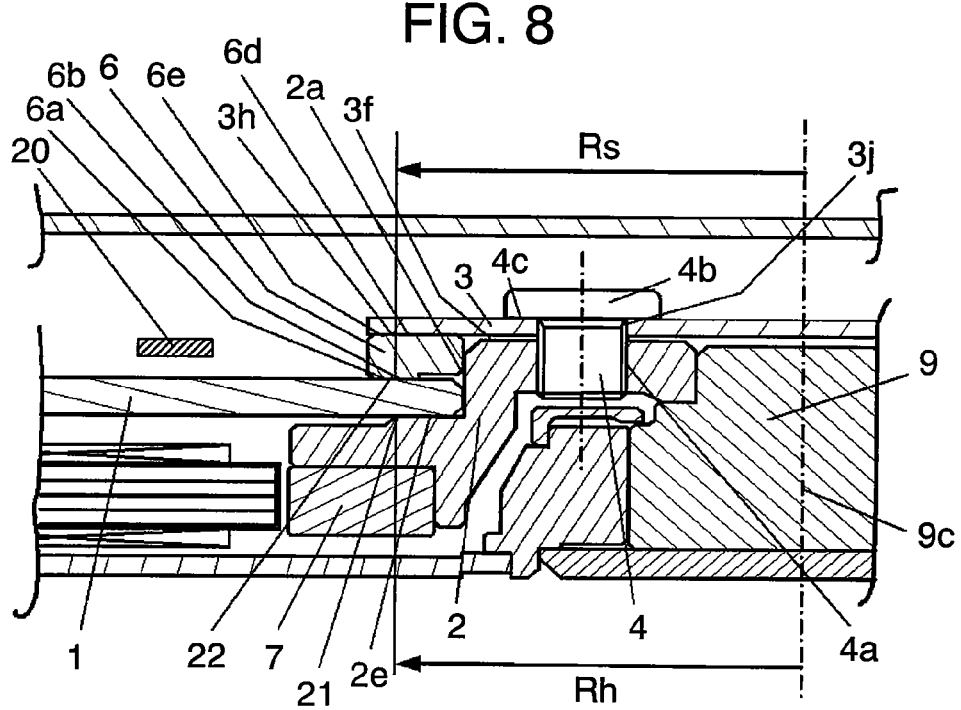
FIG. 8 is a partial section view showing a schematic structure of a disk apparatus according to Embodiment 3 of the invention.
Figure 9:
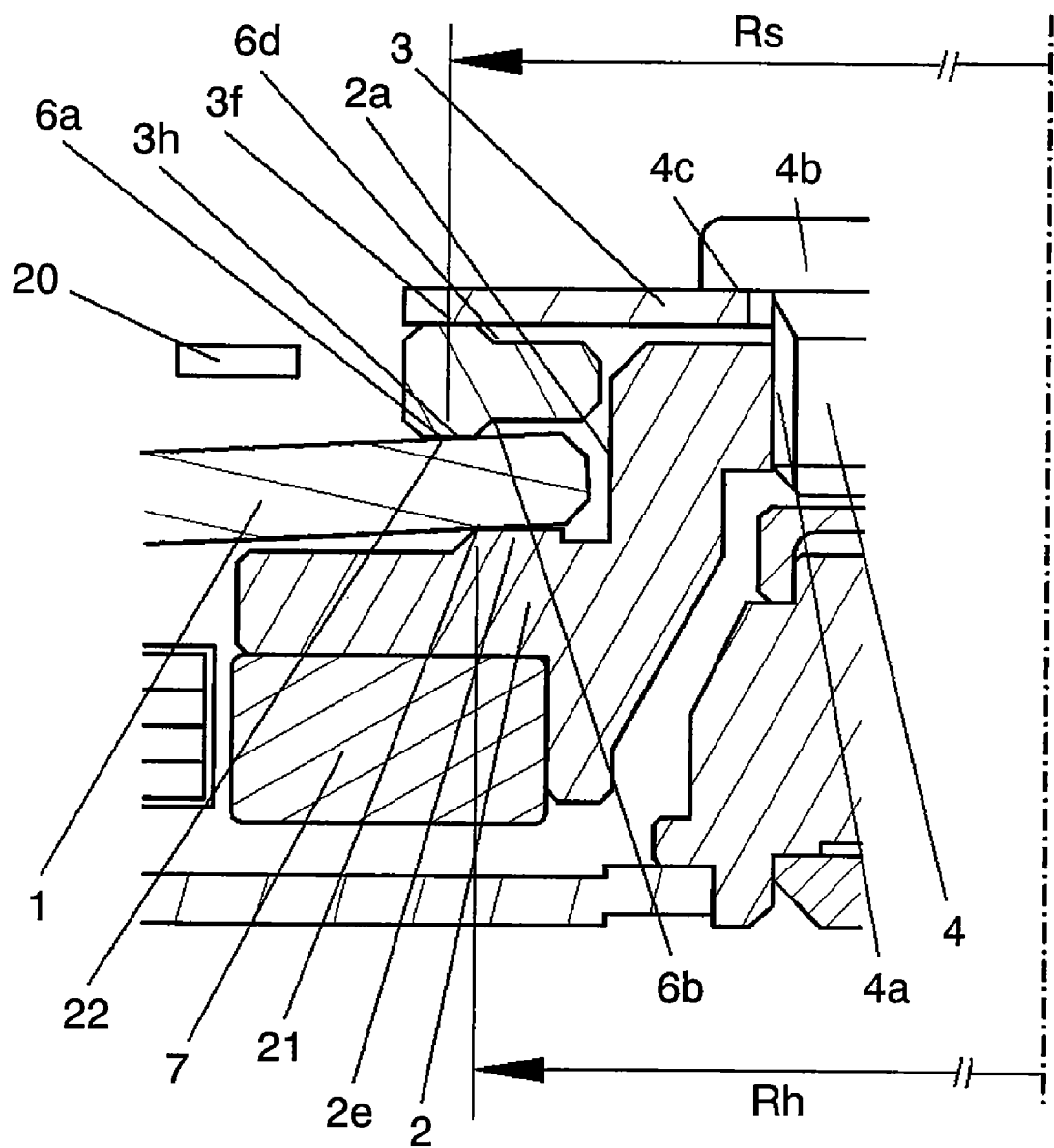
FIG. 9 is an enlarged section view showing a clamp structure of the disk apparatus according to Embodiment 3 of the invention.
Figure 10:
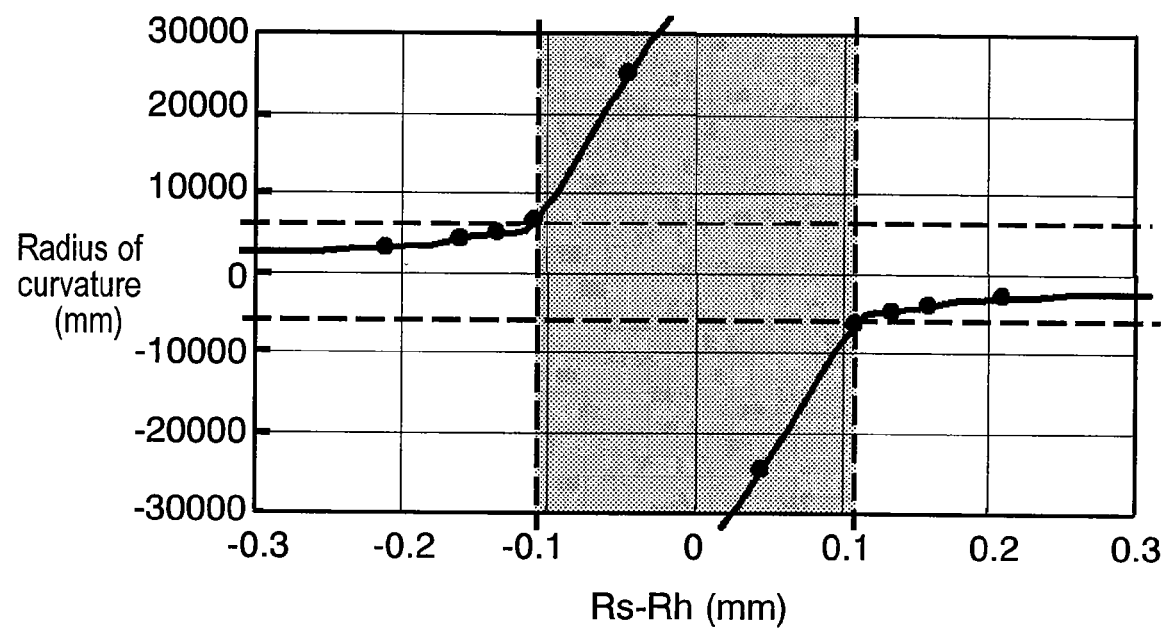
FIG. 10 is a correlation diagram showing a relationship between Rs and Rh of the disk apparatus according to Embodiment 3 of the invention and the rate of warping of a disk.
Figure 12A:
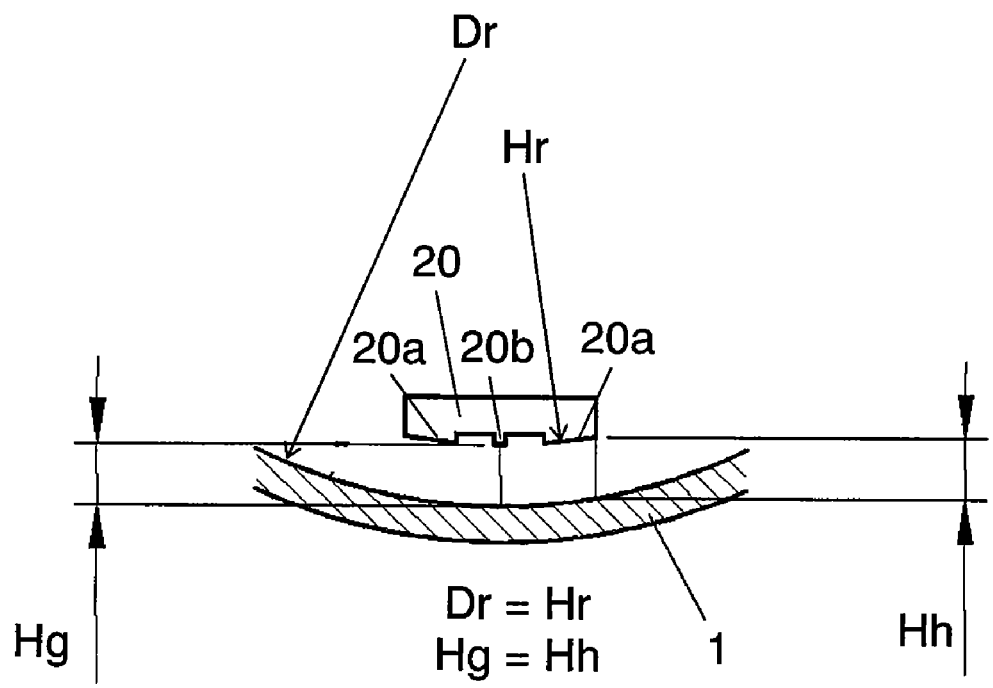
FIG. 12A is a diagram showing a relationship between the amount of head levitation and the head gap due to a warp of a disk, the rate of warping of which is equal to the rate of warping of the head of the disk apparatus according to Embodiment 3 of the invention.
Figure 12B:
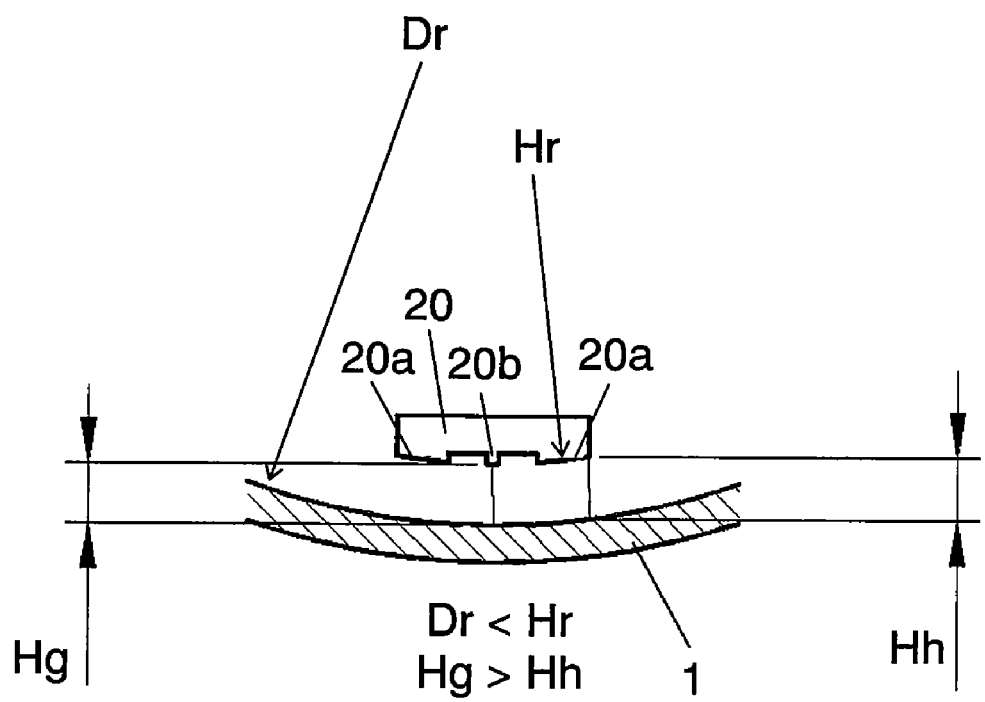
FIG. 12B is a diagram showing a relationship between the amount of head levitation and the head gap due to a warp of a disk, the rate of warping of which is larger than the rate of warping of the head.
Figure 12C:
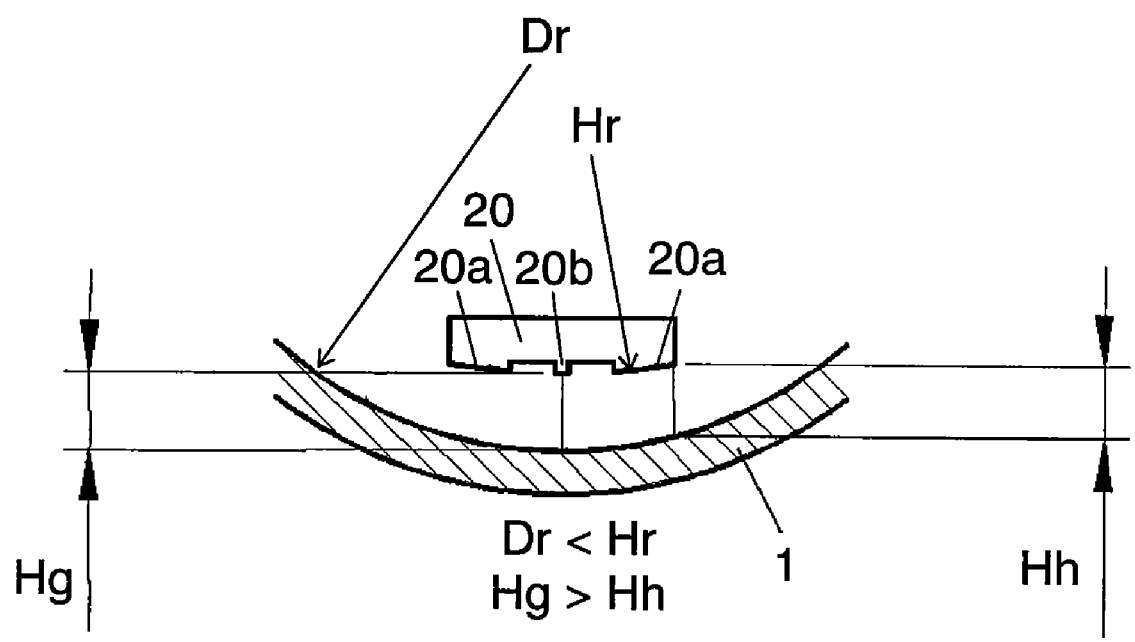
FIG. 12C is a diagram showing a relationship between the amount of head levitation and the head gap due to a warp of a disk, the rate of warping of which is smaller than the rate of warping of the head.
Figure 13:
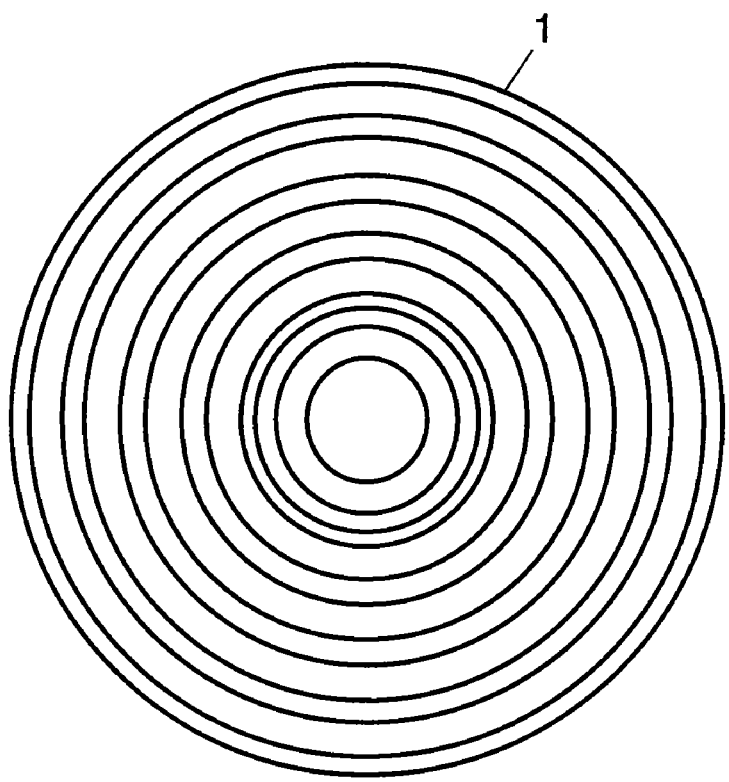
FIG. 13 is a diagram showing a deformation of a disk, which is caused by clamping in the disk apparatus according to Embodiment 3 of the invention.
Figure 14:
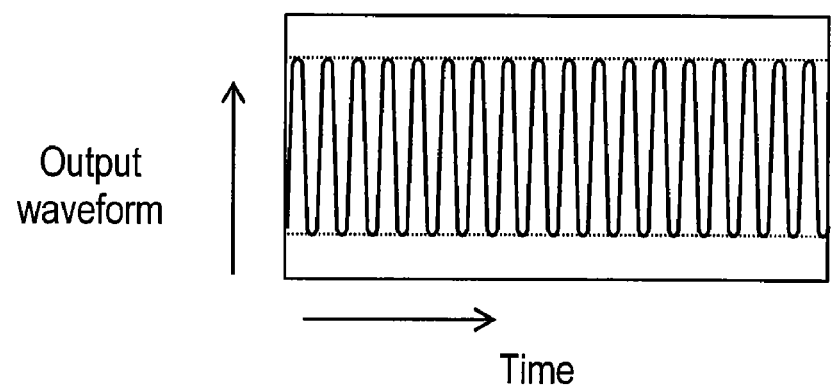
FIG. 14 is a diagram showing signal outputs from the head of the disk apparatus according to Embodiment 3 of the invention.
Figure 15:
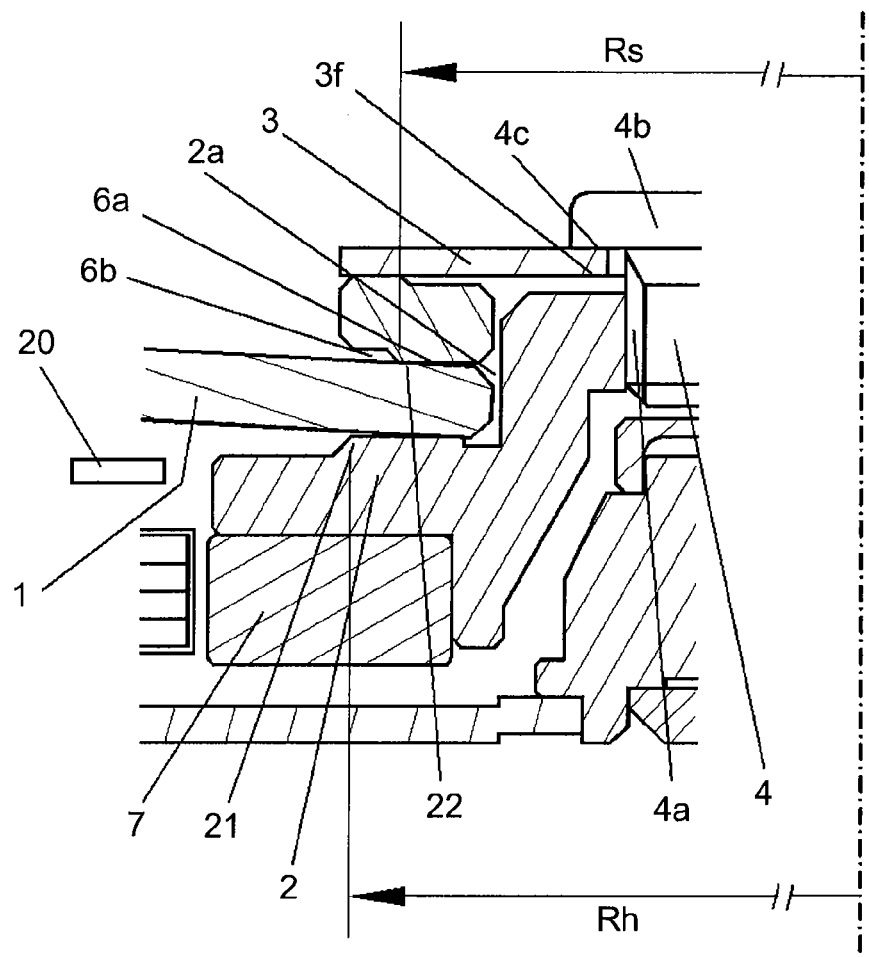
FIG. 15 is an enlarged section view showing a clamp structure of another disk apparatus according to Embodiment 3 of the invention.

Next, a disk apparatus according to Embodiment 3 of the invention will be described with reference to FIGS. 8 to 15. FIG. 8 is a partial section view showing a schematic structure of a disk apparatus according to Embodiment 3 of the invention. FIG. 9 is an enlarged section view showing a clamp structure of the disk apparatus according to Embodiment 3 of the invention. FIG. 10 is a correlation diagram showing a relationship between contact points Rh between a clamp member and a disk and between the disk and a hub, which are produced by warping of the disk due to clamping and the radius of curvature of the warping of a disk. FIG. 11 includes diagrams describing relationships between the amounts of head levitation and head gaps when the disk warps. FIG. 12 includes diagrams describing relationships between the amounts of head levitation and head gaps due to a warp of a disk when the disk and head have a rate of warping. FIG. 13 is a diagram showing deformation of the disk, which is caused by clamping in the disk apparatus according to Embodiment 3 of the invention. FIG. 14 is a diagram showing signal outputs from the head of the disk apparatus according to Embodiment 3 of the invention. FIG. 15 is an enlarged section view showing a clamp structure of another disk apparatus according to Embodiment 3 of the invention. In FIGS. 8, 9 and 15, the same reference numerals are given to the same components as those in FIGS. 1 to 5 and 7, which describe the construction of the disk apparatus according to Embodiments 1 and 2 of the invention.

In FIGS. 8 and 9, disk 1 having a hole in the inner part is inserted to disk inserting portion 2a cylindrically projecting from hub 2 fixed to rotational axis portion 9. One face of disk 1 is received by the top face of disk receiving portion 2e in the outer part of disk inserting portion 2a of hub 2. Spacer ring 6 containing a same material as that of hub 2 or a material having a closer linear expansion coefficient to that of the material of hub 2 has an inner hole through which disk inserting portion 2a of hub 2 is inserted like disk 1 and is mounted above the other face of disk 1. Furthermore, clamp member 3 is mounted on the top face of hub 2, holds disk 1 and spacer ring 6 and is clamped by screw threads 4 at multiple internal thread portions 4a on hub 2. The multiple screw threads, clamp member 3 and spacer ring 6 function as a clamp unit for clamping disk 1. In this case, since the diameter of screw head part 4b of screw threads 4 is larger than the diameter of hole 3j in clamp member 3, an axial force occurs when screw threads 4 are clamped to internal thread portions 4a on hub 2. The axial force is conducted from screw head face 4c to spacer ring 6 through bottom face 3f near the hole of clamp member 3, and clamp member 3 coaxially and integrally fixes disk 1 to hub 2. Still further, head 20 facing toward one flat part of disk 1 is provided which levitates and scans above disk 1, reads a signal recorded on disk 1 or writes a signal on disk 1. Though only head 20 is shown as a rectangular component in FIGS. 8 and 9, head 20 is, in reality, supported by a head supporting mechanism and a head supporting arm, not shown. Permanent magnet 7, which is a component of a motor for rotating hub 2, is fixed on the outer part of hub 2. Hub 2 contains a martensite steel material in order to use the magnetic force of the magnet of this permanent magnet 7 effectively and to suppress the leakage flux to head 20.

Here, holding disk 1 produces contact point 21 or a contact plane between disk receiving portion 2e of hub 2 and the bottom face of disk 1 and contact point 22 or contact plane between the top face of disk 1 and disk pressing portion 3h of spacer ring 6. The direction and amount of a warp of disk 1 are defined by the dimensions of Rh and Rs where Rh and Rs are distances from rotational axis center 9c to contact points 21 and 22, respectively. Also in the disk apparatus according to Embodiment 3, the relationship between the amount of a warp and Rh and Rs may be as shown in FIG. 6, which has been described with reference to the disk in the disk apparatus according to Embodiment 2 though it depends on the material, form and temperature of disk 1, hub 2 and clamp member 3.

Here, it is assumed that disk 1 in the disk apparatus according to Embodiment 3 shown in FIGS. 8 and 9 warps to form a curved plane having a radius of curvature Dr. The radius of curvature Dr relates to the difference (Rs−Rh) between distances Rh and Rs from the rotational axis center 9c to contact points 21 and 22, respectively. In reality, measuring the radius of curvature Dr and the difference (Rs−Rh) between distances Rh and Rs and plotting (Rs−Rh) on the horizontal axis against the radius of curvature Dr on the vertical axis results in the graphs as shown in FIG. 10, for example. As being apparent from the result in FIG. 10, the radius of curvature of disk 1 can be controlled by adjusting the relative positional relationship between Rs and Rh. Here, when the value resulting from (Rs−Rh) is negative, the radius of curvature of disk 1 exhibits a positive value, which indicates that disk 1 warps toward the head 20. When the value resulting from (Rs−Rh) is positive, the radius of curvature of disk 1 exhibits a negative value, which indicates that disk 1 warps toward the hub.

Figure 11A:
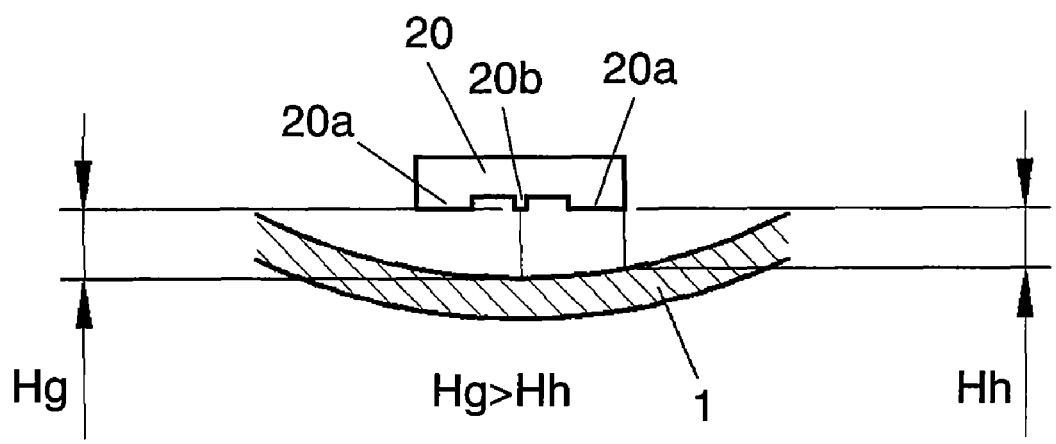
FIG. 11A is a diagram showing a relationship between the amount of head levitation and the head gap when the warp of a disk in the disk apparatus according to Embodiment 3 of the invention has a concave form with respect to the head.
Figure 11B:
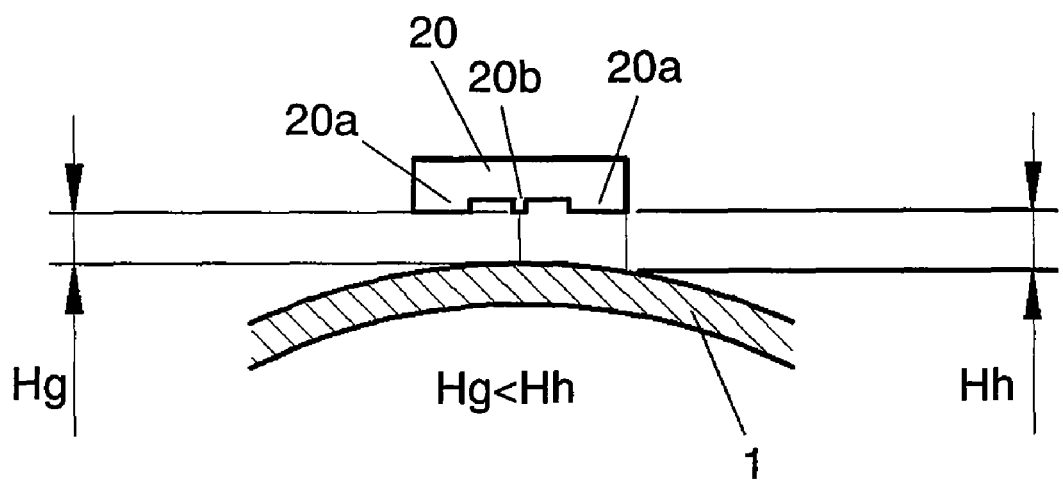
FIG. 11B is a diagram showing a relationship between the amount of head levitation and the head gap when the warp of a disk has a convex form with respect to the head.

Next, the relationship between the radius of curvature of disk 1 and the amount of levitation of head 20 will be described with reference to FIGS. 11A to 12C. FIG. 11A is a diagram showing a relationship between the amount of head levitation and the head gap when the warp of the disk has a concave form with respect to the head. FIG. 11B is a diagram showing a relationship between the amount of head levitation and the head gap when the warp of a disk has a convex form with respect to the head. FIG. 12A is a diagram showing a relationship between the amount of head levitation and the head gap due to a warp of the disk, the rate of warping of which is equal to the rate of warping of the head. FIG. 12B is a diagram showing a relationship between the amount of head levitation and the head gap due to a warp of the disk, the rate of warping of which is larger than the rate of warping of the head. FIG. 12C is a diagram showing a relationship between the amount of head levitation and the head gap due to a warp of the disk, the rate of warping of which is smaller than the rate of warping of the head.

First of all, the relationship between the amount of head levitation and the head gap due to a warp of disk 1 when the surface of head 20 facing toward disk 1 is flat will be described. FIG. 11A shows a state in which disk 1 warps to a concave form with respect to head 20. The surface of head 20 facing toward disk 1 has air baring rail 20a at both ends in the direction of the radius of disk 1 and center rail 20b substantially at the center. Air bearing rail 20a is for levitating head 20. Center rail 20b has a head element for writing/reading information. The amount of levitation of head 20 depends on air bearing rail 20a on both sides of head 20. Thus, as shown in FIG. 11A, the deformation of disk 1 to a concave form with respect to head 20 results in Hg>Hh where Hh is the amount of levitation of head 20 and Hg is the distance between disk 1 and the head element in center rail 20b. Therefore, the amount of levitation of the part of center rail 20b having the head element is higher than the designed value. As a result, a sufficient head output cannot be obtained.

On the other hand, FIG. 11B shows a state in which disk 1 warps to a convex form with respect to head 20. Like FIG. 11A, the deformation results in Hg<Hh where Hh is the amount of levitation of head 20 and Hg is the distance between disk 1 and the head element. Hence, the amount of levitation of the part of center rail 20b having the head element is lower than the designed value, and the head output increases. Therefore, the output signal obtained from head 20 can be larger than the designed value by clamping and warping disk 1 to a convex form with respect to head 20 when the surface of head 20 facing toward dusk 1 is flat, that is, when the radius of curvature of the surface of head 20 facing toward disk 1 is infinite. As a result, a good head output can be obtained.

Next, the relationship between the amount of head levitation and the head gap due to a warp of disk 1 when the surface of head 20 facing toward disk 1 has a form having the radius of curvature Hr in the direction of the radius of disk 1 with center rail 20b having the head element at the top of the form will be described with reference to FIGS. 12A to 12C.

As shown in FIG. 12A, when the radius of curvature Dr of the warp of disk 1 is equal to the radius of curvature Hr of head 20, the amount of levitation Hh of head 20 from disk 1 and distance Hg between disk 1 and the head element in center rail 20b are equal. Therefore, the head output of head 20 does not decrease. As shown in FIG. 12B, when the radius of curvature Dr of the warp of disk 1 is larger than the radius of curvature Hr of head 20, distance Hg between disk 1 and the head element is smaller than the amount of levitation Hh of head 20 from disk 1. Therefore, the head output of head 20 increases. As shown in FIG. 12C, when the radius of curvature Dr of the warp of disk 1 is smaller than the radius of curvature Hr of head 20, distance Hg between disk 1 and the head element is larger than the amount of levitation Hh of head 20 from disk 1. Therefore, the head output of head 20 decreases.

Accordingly, the form of a warp of disk 1 caused by clamping is constructed to have the radius of curvature Dr equal to the radius of curvature Hr of head 20 or larger than the radius of curvature Hr with respect to head 20 or to have a convex form toward the head 20 side when the surface of head 20 facing toward dusk 1 has the radius of curvature Hr in the direction of the radius of disk 1 with center rail 20b having the head element at the top of the form. As a result, the output signal obtained from head 20 can be larger than the designed value, and a good head output can be obtained.

For example, when the width of head 20 in the direction of the radius of disk 1 is 0.7 mm and the difference in height between the head element and the end of the head is 10 nm, the absolute value of the radius of curvature of head 20 is 6125 mm. Therefore, disk 1 may be held by defining the relationship between distance Rh from rotational axis center 9c to contact point 11 between hub 2 and disk 1 and distance Rs from rotational axis center 9c to contact point 12 between disk 1 and spacer ring 6, that is, the central point of the contact plane such that the absolute value of the radius of curvature of disk 1 can be equal to or larger than 6125 mm. In other words, the range of (Rs−Rh) resulting in the absolute value of the radius of curvature of disk 1 equal to or larger than 6125 mm is −0.12 mm≦(Rs−Rh)≦0.12 mm with reference to FIG. 10. Therefore, the occurrence of a decrease in output of head 20 due to the deformation of disk 1 can be prevented by defining the absolute value of the difference between Rs and Rh as 0.12 mm or below (the hatched area in FIG. 10).

In the construction of the disk apparatus according to Embodiment 3 of the invention, like the disk apparatus according to Embodiment 2, the distance on the side having head 20 with respect to disk 1 may be defined to be larger, that is, to satisfy the relationship below:

$$Rs > Rh \quad \text{(Equation 5)}$$

Thus, like the invention of Embodiment 2, the direction and amount of a warp of disk 1 and the radius of curvature of the warp of disk 1 can be controlled by adjusting the relationship between Rs and Rh by using the graph shown in FIGS. 6 and 10.

Spacer ring 6 is processed with high precision in order to press disk 1 evenly and prevent the distortion and/or undulation in the direction of the circumference. For example, the flatness deviation of contact plane 6a of spacer ring 6 in contact with the top face of disk 1 is equal to or lower than 5 µm. Since the form of spacer ring 6 is simple such as a ring form, the surface (contact plane 6a) in contact with the top face of disk 1 can be easily flattened. Furthermore, contact plane 6a of spacer ring 6 in contact with the top face of disk 1 has elevation change 6b at a part of the outer part in order to prevent the distortion of the disk when disk 1 warps. Contact plane 6e of spacer ring 6 in contact with bottom face 3f of clamp member 3 also has elevation change 6d at a part of the outer part. With elevation change 6d, clamp member 3 can be elastically deformed with clamp member 3 is held by and fixed to hub 2 with screw threads 4. Thus, in the disk apparatus according to Embodiment 3 of the invention, the looseness of screw threads 4 and a change in clamping force upon change in temperature due to differences in linear expansion coefficients of the different materials of clamp member 3, screw threads 4, disk 1 and hub 2, for example, can be minimized.

Since permanent magnet 7 for rotating the motor is often held integrally to hub 2, hub 2 desirably contains a magnetic material in order to reduce leakage flux of permanent magnet 7. Accordingly, spacer ring 6 may contain a magnetic material with high hardness such as SUS420, that is, a magnetic material of a Vickers Hardness of 500 or higher and a Young's modulus of 200000 N/mm² or higher. Thus, the distortion and/or deformation (or undulation) of disk 1 in the direction of the radius of clamp member 3 does not have an influence on the data-formed area of the disk since the disk apparatus according to Embodiment 3 of the invention shown in FIGS. 8 and 9 holds disk 1 through spacer ring 6. In fact, as shown in FIG. 13, the influence of the distortion and/or undulation of disk 1 due to clamping is hardly recognized. FIG. 13 is a diagram showing deformation of the disk by clamping in the disk apparatus according to Embodiment 3 of the invention.

Here, the positional relationship between distance Rh and distance Rs does not change easily independently of a change in ambient temperature when hub 2 and spacer ring 6 contain a same material or when hub 2 and spacer ring 6 contain materials having equal or substantially equal linear expansion coefficients where distance Rh is a distance from rotational axis center 9c of a motor to contact point 21 or contact plane between disk receiving portion 2e of hub 2 and the bottom face of disk 1, and distance Rs is a distance from rotational axis center 9c of the motor to contact point 22 or contact plane 6a between the top face of disk 1 and disk pressing portion 3h of spacer ring 6, which are produced by the attachment of clamp member 3. Here, since the warp in the direction of the radius of disk 1, which is caused by clamping of disk 1, depends on the positional relationship between Rh and Rs, the change in amount of the warp in the direction of the radius can be reduced independently of the change in ambient temperature atmosphere of the disk apparatus according to Embodiment 3 of the invention.

In other words, in the disk apparatus according to Embodiment 3 of the invention, the distance on the side having head 20 is larger with respect to disk 1 in the relationship between distance Rh from the rotational axis center 9c to contact point 21 or contact plane between disk receiving portion 2e of hub 2 and the bottom face of disk 1 and distance Rs from the rotational axis center 9c to contact point 22 or contact plane 6a between the top face of disk 1 and disk pressing portion 3h of spacer ring 6, which are produced by holding disk 1. Then, the clamping deforms disk 1 to a convex form with respect to head 20. Thus, the distance between head 20 and the position on the outer side of disk 1 is large in comparison with the height of the center part of disk 1 and the height of levitation of head 20. Therefore, the end of head 20 does not touch disk 1 basically when head 20 levitates from disk 1. As a result, the simple construction as shown in FIGS. 8 and 9 allows stable head levitation and can prevent contact between head 20 and disk 1. Also in this construction, the positions of contact points 21 and 22 must be defined as required such that the contact between the end of hub 2 on the outer side and the bottom face of disk 1 can be prevented.

The processing with high precision, which can be achieved since the forms of the parts included in the clamp mechanism for holding disk 1 integrally to hub 2 are simple, can reduce the distortion of the disk due to clamping. In addition, the same material contained in hub 2 and spacer ring 6 or the materials having the same or substantially same linear expansion coefficient of hub 2 and spacer ring 6 can reduce the relative change in positions where the both faces of disk 1, which are held thereby, are in contact with contact points 21 and 22. The small change in amount of the warp in the direction of the radius due to a change in temperature as a result can produce a constant direction, amount (angle) and the radius of curvature Dr of the warp of disk 1 in the direction of the radius, which stabilizes the amount of levitation of head 20.

As being apparent from the example shown in FIG. 14, the integral fixing to hub 2 through spacer ring 6 can prevent the modulation such as the distortion and/or undulation due to the clamping of the screw threads and prevent a decrease in error rate due to an increase in time jitter of data reading pulses. As a result, accurate data writing/reading can be performed. Furthermore, the positioning of the head to a target track and/or data writing/reading can be performed accurately, which does not easily cause the contact with disk 1 due to a decrease in amount of levitation thereof. Thus, stable head levitation can be achieved even with a thinner disk, which allows a decrease in thickness and an increase in capacity of the disk apparatus. FIG. 14 is a head signal output diagram in the disk apparatus according to Embodiment 3 of the invention.

In this way, even with thinner disk 1, the amount of head levitation can be stabilized by determining the radius of curvature of a warp of disk 1, which is caused by clamping, in accordance with the radius of curvature of head 20 and determining the construction of the clamp such that the radius of curvature of disk 1 can fall in the range. As a result, the decrease in head output can be prevented while the decrease in thickness and increase in capacity of the disk apparatus can be achieved.

Having described the example in which one disk is applied as shown in FIGS. 8 and 9 in the disk apparatus according to Embodiment 3 of the invention, the number of disk is not limited to one. For example, in a disk apparatus having two disks, the equivalent spacer ring may be provided between the first one and the second one.

Having described the example in which hub 2 and spacer ring 6 contain materials having substantially equal linear expansion coefficients as described above in the disk apparatus according to Embodiment 3 of the invention, the disk apparatus according to Embodiment 3 of the invention is not limited to the example. In addition to the example, the absolute value of (Rs−Rh) may be defined to satisfy (equation 1) below:

$$|Rs-Rh|+R\times|\alpha-\beta|\times T-25|\leqq 0.12 \quad \text{(Equation 6)}$$

at a temperature T in the range of temperatures Tmin to Tmax when the operation-guaranteed temperature of the disk apparatus is Tmin (° C.) to Tmax (° C.) where the linear expansion coefficient of hub 2 is $\alpha/°$ C., the linear expansion coefficient of the clamp member is $\beta/°$ C., and the schematic radius of the claming position is R.

$$R=(Rs+Rh)/2 \quad \text{(Equation 7)}$$

is defined with the schematic radius R as an effective radius and 25° C. as a normal temperature, and (equation 1) must be satisfied in both cases with Tmin and Tmax. When the linear expansion coefficients of the components are $\beta>\alpha$, the direction of warping of disk 1 can be always fixed to one direction at a temperature in the range of operation-guaranteed temperatures based on the result of setting the relationship between Rh and Rs with Tmin=−20° C. and at the normal working temperature (25° C.) such that the amount of a warp of disk 1 can be zero into $$Rs-Rh\geqq(25-(-20))\times(\beta-\alpha)\times R=45\times(\beta-\alpha)\times R \quad \text{(Equation 8)}$$

Conversely, when the linear expansion coefficients of the components are $\alpha>\beta$, the direction of warping of disk 1 can be always fixed to one direction at a temperature in the range of operation-guaranteed temperatures based on the result of setting the relationship between Rh and Rs with Tmax=80° C. and at the normal working temperature (25° C.) such that the amount of a warp of disk 1 can be zero into $$Rs-Rh\geqq(80-25))\times(\alpha-\beta)\times R=55\times(\alpha-\beta)\times R \quad \text{(Equation 9)}$$

Therefore, the materials of hub 2 and spacer ring 6 do not have to have an equal or substantially equal linear expansion coefficient or coefficients.

The calculation of (Rs−Rh) to satisfy (equation 1) can define the amount of a warp of disk 1 to be defined in the disk apparatus having the measurement results as shown in FIGS.

6 and 10, for example, and also obtain the relative positional relationship between distance Rs with respect to disk receiving portion 2e and distance Rh with respect to spacer ring 6, which form the radius of curvature of the warp. Notably, the value (0.12 mm) on the right side of (equation 1) corresponds to the disk apparatus having the measurement results as shown in FIG. 10 and apparently depends on a given disk apparatus.

Having described the disk apparatus shown in FIGS. 8 and 9 having the construction including head 20 for recording/reproducing a signal on the side close to the clamp, that is, above disk 1, for example, head 20 for reading signals may be provided below disk 1 as shown in FIG. 15 in the disk apparatus according to Embodiment 3 of the invention. In this case, the relationship between distances Rh and Rs from rotational axis center 9c to contact points 21 and 22, respectively, may be defined to satisfy the relationship below:

$$Rh > Rs \qquad \text{(Equation 10)}$$

Also in this case, the direction, amount and radius of curvature of a warp of disk 1 can be controlled by adjusting the relationship between Rs and Rh by using the graphs shown in FIGS. 6 and 10.

Thus, also in the disk apparatus having the construction including head 20 below disk 1 as shown in FIG. 15, the distance on the side having head 20 with respect to disk 1 is increased in the relationship between distance Rh from rotational axis center 9c to contact point 21 or contact plane between hub 2 and disk 1 and distance Rs from rotational axis center 9c to contact point 22 or contact plane 6a between disk 1 and spacer ring 6, which are produced by holding disk 1 with spacer ring 6. In this construction, disk 1 has a convex form by the clamping with respect to head 20 though it is opposite to that in FIGS. 8 and 9. Since the distance between head 20 and the position on the outer side of disk 1 is large in comparison with the height of the position at the center part of disk 1 and the height of levitation of head 20. The end of head 20 does not touch disk 1 basically as far as head 20 levitates from disk 1. Therefore, the simple construction as shown in FIG. 15 allows stable head levitation and can prevent contact between head 20 and disk 1.

The clamp mechanism for holding disk 1 between hub 2 and spacer ring 6 is also not limited to the construction in the descriptions of the embodiments of the invention.

As described above, in the disk apparatus according to the invention having a head for writing/reading on one side of a disk only, the form of the disk can be a convex form with respect to the side having the head. Thus, stable head levitation can be achieved, and the contact between the head and the disk can be prevented. Furthermore, in the disk apparatus of the invention, the flat form of the disk receiving portion may be changed to a convex form with respect to the side having the head. Thus, the form of the disk can be convex with respect to the side having the head in the simple construction. Therefore, with the simple construction, stable head levitation can be achieved, and the contact between the head and the disk can be prevented. Furthermore, in the relationship between distance Rh from the rotational axis center to the contact point or contact plane between the hub and the disk and distance Rs from the rotational axis center to the contact point or contact plane between the disk and the clamp member, which are produced by holding the disk, in the disk apparatus of the invention, one on the side having the head with respect to the disk may be increased, which results in the disk having a convex form with respect to the side having the head independently of the flat form of the disk receiving portion. Thus, stable head levitation can be achieved, and the contact between the head and the disk can be prevented. Still further, in the relationship between distance Rh from the rotational axis center to the contact point or contact plane between the hub and the disk and distance Rs from the rotational axis center to the contact point or contact plane between the disk and the spacer ring, which are produced by holding the disk with the clamp member through the spacer ring, in the disk apparatus of the invention, one on the side having the head with respect to the disk may be increased, which results in the disk having a convex form with respect to the side having the head independently of the flat form of the disk receiving portion. Thus, independently of a working temperature environment, stable head levitation can be achieved, and the contact between the head and the disk can be prevented.

In addition, the disk may be held between the hub and the spacer ring by defining the direction and amount of the deformation of the disk such that the distance from the surface of the disk to the head element of the head can be smaller than the distance from the surface of the disk to the air bearing rail of the head. Thus, stable head levitation and head output can be achieved, and the contact between the head and the disk can be prevented. As a result, even with a thinner disk, stable head levitation and head output can be achieved, which can decrease the thickness and increase the capacity of the disk apparatus.

INDUSTRIAL APPLICABILITY

In a disk apparatus according to the invention, fixing a disk to a hub through a spacer ring, which can provide flatness in a simple form, can provide a disk mounting structure, which can reduce the deformation of the disk. Furthermore, the equal or substantially equal linear expansion coefficient or coefficients of the hub and spacer ring does/do not easily change, independently of a change in ambient temperature, the positional relationship between distance Rh from the rotational axis center of a motor to the contact point or contact plane between the hub and the disk and distance Rs from the rotational axis center of the motor to the contact point or contact plane between the disk and the spacer ring, which are produced by the attachment of a clamp member. As a result, since the relative position of those in contact with and holding the disk does not change on both faces of the disk, the change in a warp in the direction of the radius of the disk due to a temperature change can be small. Thus, the disk apparatus can have a fixing structure to the spindle of the disk with the head having a stable amount of levitation independently of a change in ambient temperature, which can prevent the contact between the head and the disk. Therefore, the disk apparatus, which can allow a decrease in size and an increase in capacity, may be useful in information writing/reading equipment.

The invention claimed is:

1. A disk apparatus, comprising:
   a hub having a disk inserting portion having a cylindrical plane in the outer part of one end and a disk receiving portion having a flat part and being pivotably supported;
   a disk-shaped recording medium having an inner hole through which the disk inserting portion is fitted and being held by the disk receiving portion;
   a head facing toward at least one face of the disk-shaped recording medium, levitating and scanning above the disk-shaped recording medium and reading a signal recorded on the disk-shaped recording medium or writing a signal on the disk-shaped recording medium; and
   clamp means holding the disk-shaped recording medium with the disk receiving portion, the clamp means having a clamp member mounted on a top face of the hub, wherein the hub is formed with a contact point or contact plane between the hub and the disk-shaped recording medium at a distance Rh from a rotational axis center and the clamp member is formed with a contact point or contact plane between the clamp member and the disk-shaped recording medium at a distance Rs from the rotational axis center, and wherein a difference between the distances Rh and Rs is selected so that the disk-shaped recording medium includes a warp greater than 0 μm and less than or equal to 15 μm, an amount of the warp being controlled independent of a predetermined operating temperature, and wherein a relationship between the distances Rh and Rs is Rs<Rh when the head is provided on the disk receiving portion side of the hub with respect to the disk-shaped recording medium and is Rs>Rh when the head is provided on the clamp member side.

2. The disk apparatus of claim 1, wherein the clamp means has multiple screw threads, clamps the clamp member mounted on the top face of the hub with the multiple screw threads, and holds the disk-shaped recording medium by using the clamp member; and wherein the form of the center part of the disk-shaped recording medium has a convex form with respect to the side having the head.

3. The disk apparatus of claim 1, wherein the clamp means includes a spacer ring having a closer linear expansion coefficient to that of the material of the hub;

wherein the clamp member holds the disk-shaped recording medium; and wherein the form of the center part of the disk-shaped recording medium has a convex form with respect to the side having the head.

4. The disk apparatus of claim 3, wherein the spacer ring has a ring shape having elevation changes on the surface to be in contact with the disk-shaped recording medium and the surface to be in contact with the clamp member.

5. The disk apparatus of claim 4, wherein the spacer ring contains a material of a Vickers hardness of 500 or higher and a Young's modulus of 200000 N/mm$^2$ or higher.

6. The disk apparatus of claim 5, wherein the flatness of the spacer ring is 5 μm or lower.

7. The disk apparatus of claim 1, wherein the head has, in the direction of the radius of the disk-shaped recording medium, a head element in the center part and an air bearing rail on both ends; and the distance between the surface of the disk-shaped recording medium and the head element is larger than the distance between the surface of the disk-shaped recording medium and the air bearing rail.

8. The disk apparatus of claim 1, wherein the hub includes a linear expansion coefficient ($\alpha$), the clamp member includes a linear expansion coefficient ($\beta$), the predetermined operating temperature ($T_{op}$) is between a first operating temperature ($T_1$) and a second operating temperature ($T_2$), the difference between the distances Rh and Rs is selected such that:

$$Rs-Rh \geq (T_{op}-T_1) \times (\beta-\alpha) \times R$$

when $\beta > \alpha$, where R=(Rs+Rh)/2, and the difference between the distances Rh and Rs is selected such that:

$$Rs-Rh(T_2-T_{op}) \times (\alpha-\beta) \times R$$

when $\alpha > \beta$.

* * * * *